(12) United States Patent
Allen et al.

(10) Patent No.: US 10,976,513 B2
(45) Date of Patent: Apr. 13, 2021

(54) CABLE BRACKET ASSEMBLY

(71) Applicant: CommScope Technologies LLC, Hickory, NC (US)

(72) Inventors: Barry Wayne Allen, Siler City, NC (US); Thomas Ross Marmon, Angier, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/555,739

(22) Filed: Aug. 29, 2019

(65) Prior Publication Data

US 2020/0073071 A1 Mar. 5, 2020

Related U.S. Application Data

(60) Provisional application No. 62/725,106, filed on Aug. 30, 2018.

(51) Int. Cl.
*G02B 6/44* (2006.01)
*G02B 6/14* (2006.01)

(52) U.S. Cl.
CPC ........... *G02B 6/4471* (2013.01); *G02B 6/443* (2013.01)

(58) Field of Classification Search
CPC .......... G02B 6/44; G02B 6/4471; G02B 6/14
USPC ........................................................ 257/290
See application file for complete search history.

(56) References Cited

U.S. PATENT DOCUMENTS

| 5,181,026 | A | * | 1/1993 | Granville | ............ | H02J 3/00034 |
| | | | | | | 340/870.28 |
| 5,271,080 | A | * | 12/1993 | Hopper | ................ | G02B 6/4428 |
| | | | | | | 385/137 |
| 5,485,745 | A | * | 1/1996 | Rademaker | ........... | E21B 47/002 |
| | | | | | | 73/152.39 |
| 5,491,766 | A | | 2/1996 | Huynh et al. | | |
| 5,722,840 | A | * | 3/1998 | Auclair | .................. | H01R 4/363 |
| | | | | | | 439/793 |
| 6,322,378 | B1 | * | 11/2001 | Auclair | .............. | H01R 13/5812 |
| | | | | | | 439/98 |
| 6,340,250 | B1 | * | 1/2002 | Auclair | ................ | G02B 6/4477 |
| | | | | | | 385/87 |
| 8,189,983 | B2 | | 5/2012 | Brunet et al. | | |
| 8,213,760 | B2 | | 7/2012 | Rudenick et al. | | |
| 9,442,265 | B2 | | 9/2016 | Hill et al. | | |
| 2010/0285678 | A1 | * | 11/2010 | Mech | ................... | H01R 13/533 |
| | | | | | | 439/101 |

(Continued)

FOREIGN PATENT DOCUMENTS

WO 2017046187 A2 3/2017

OTHER PUBLICATIONS

International Application No. PCT/US2019/036713, filed Jun. 12, 2019, entitled "Telecommunications Enclosure With a Separate Mountable Hinge".

(Continued)

*Primary Examiner* — Kaveh C Kianni
(74) *Attorney, Agent, or Firm* — Merchant & Gould P.C.

(57) ABSTRACT

The present disclosure relates to grounding assemblies for cables entering telecommunications enclosures. The grounding assemblies include a grounding attachment interface, a strength member fixation mount, and first and second cable fixation mounts that are electrically coupled together to ground strength members and a conductive shield of a cable.

12 Claims, 22 Drawing Sheets

(56) References Cited

U.S. PATENT DOCUMENTS

| | | |
|---|---|---|
| 2011/0255837 A1 | 10/2011 | Solheid et al. |
| 2013/0294735 A1* | 11/2013 | Burris .................. G02B 6/4471 385/101 |
| 2017/0033544 A1 | 2/2017 | Coenegracht et al. |
| 2018/0261986 A1* | 9/2018 | Kempeneers ............ H01R 4/38 |

OTHER PUBLICATIONS

International Application No. PCT/US2019/017904, filed Feb. 13, 2019, "Sealed Closure With Fiber Optic Organizer".

\* cited by examiner

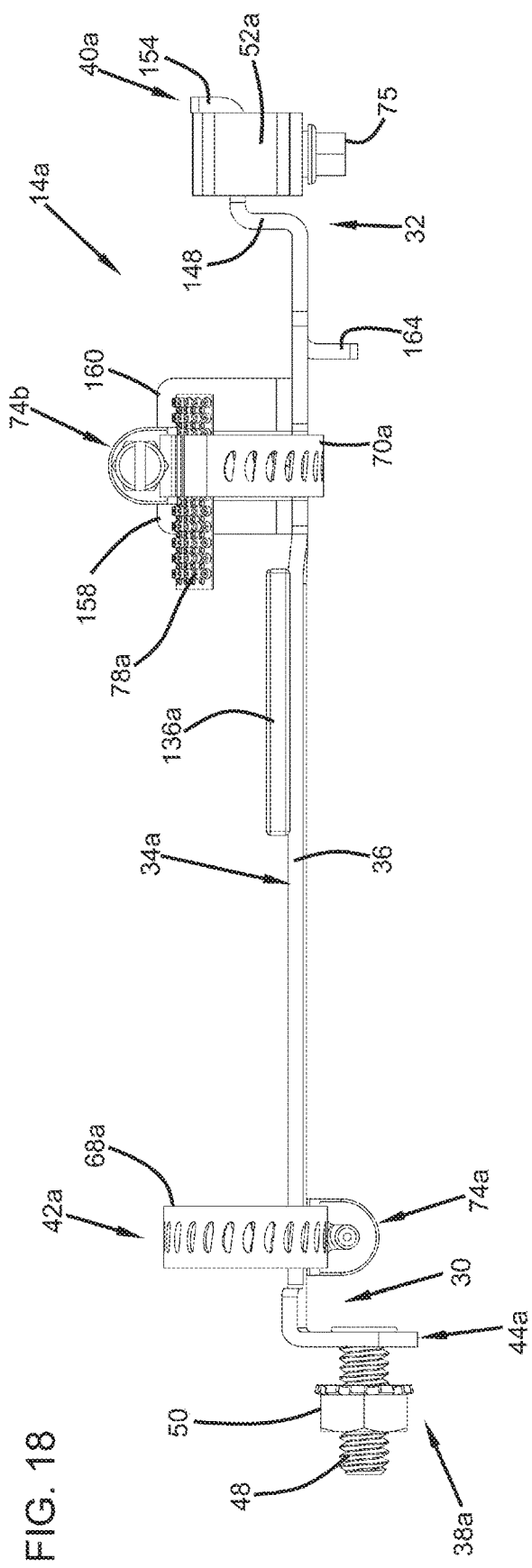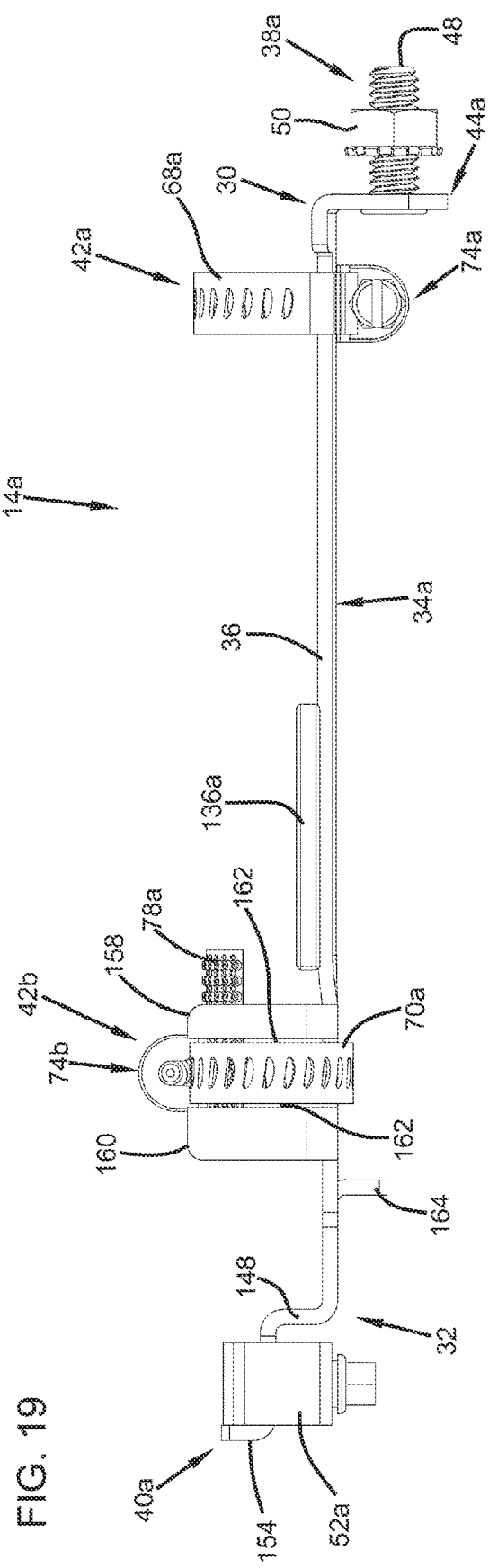

CABLE BRACKET ASSEMBLY

CROSS REFERENCE TO RELATED APPLICATION

This application claims the benefit of U.S. Provisional Application No. 62/725,106, filed Aug. 30, 2018, the disclosure of which is hereby incorporated herein by reference in its entirety.

TECHNICAL FIELD

The present disclosure relates to fiber optic cables, and more particularly to cable bracket assemblies and systems for electrically connecting components of fiber optic cables.

BACKGROUND

In many traditional communications networks, fiber optic cables have been used to carry data long distances between telecommunication company installations. In such traditional communications networks, other types of cables, such as copper wire loops and coaxial cables, have been used to carry data from telecommunication company installations to homes and businesses. Recently, there has been a movement to extend the fiber optic portion of the communications networks closer to homes and businesses. In some circumstances, the fiber optic portions of the communications networks extend into to the homes and businesses themselves.

Extending the fiber optic portion of a communications network closer to homes and businesses has necessitated the deployment of telecommunications enclosures. The telecommunications enclosure can be designed to facilitate splicing and termination of one or more fiber optic cables. A typical telecommunications enclosure has a set of cable entry ports through which fiber optic cables enter the telecommunications enclosure. One or more of the cable entry ports may accommodate "feeder" cables that connect to upstream points, such as telecommunications company installations, in a communications network. One or more of the other cable entry ports may accommodate "drop" cables that connect to downstream points in the communications network, such as homes and businesses.

Depending on the communication network architecture, the telecommunications enclosure may be a buried closure, an aerial closure or terminal, a fiber distribution hub or an optical network terminal in an outside plant or a wall mount communication box, a fiber distribution hub, a wall mount patch panel, or an optical network terminal in premise applications. In certain applications, the enclosure/housing needs to be water and contaminant (e.g., dust) proof or water-resistant. In particular, water, moisture, cleaning fluids, dust, etc. present at the exterior of the housing/enclosure should be prevented by the housing/enclosure from reaching components within the interior of the enclosure/housing. To provide such protection, enclosures can include a seal (e.g., a gel seal) around the perimeter of the enclosure or portions of the perimeter of the enclosure. One or more sealing blocks (e.g., gel blocks) housed in one of the housing pieces can be compressed against corresponding sealing blocks in another housing piece to form a seal therebetween. To accommodate cables or other components (e.g., grounding studs) entering the enclosure through ports in the enclosure wall, corresponding sealing blocks positioned at the port locations of the enclosure can include sealing blocks with cutouts therein such that the sealing blocks can be compressed around the cable or grounding stud forming a seal.

By swapping out the sealing blocks at the cable ports, the enclosure can be customized according to varying numbers and sizes of cables entering the enclosure while still providing an internal environment sealed off from the outside. For example, sealing blocks with cutouts of a first diameter can be swapped for sealing blocks with cutouts of a second diameter to accommodate a different diameter cable. In addition, varying the degree of compression of the sealing blocks about a cable or grounding stud can allow for selectively sealing different diameter cables or studs. In addition, cable ports not in use can be closed off by swapping sealing blocks having cable cutouts for sealing blocks that do not have cutouts.

Typically, cables entering telecommunications enclosures must be fixed in place inside the enclosure. Cable clamps attached to the interior of the enclosure can be used for this purpose. In addition, as alluded to above, there is a need to electrically ground certain telecommunications enclosures. The electrical grounding may be used to dissipate static electricity, provide a return path for electrical power, provide a safety ground in case of equipment malfunction, etc. Certain enclosure housings are made of nonconductive material (e.g., plastic, fiber glass, etc.). As the enclosure/housing may not readily conduct electricity, a grounding point may be provided inside of the enclosure/housing via grounding bolt(s) through a wall or ground wire(s) through a gel sealing portion of the enclosure.

There is a continued need for improvement in grounding to provide accessibility to grounding hardware without having to enter an enclosure and cause disruption.

SUMMARY

Aspects of the present disclosure relates to a cable bracket assembly (e.g., cable fixation device) for a telecommunications enclosure, to a system of a cable bracket assembly, and also to a method for fixing a fiber optic cable.

One advantageous feature of the cable bracket assembly in accordance with the present disclosure includes that the cable bracket assembly provides fixing of fiber optic components. That is, the cable bracket assembly can be used to fix all components of an individual fiber optic cable inside of an enclosure. The cable bracket assembly can also help to align the fiber optic cable within an enclosure gel block to improve sealing.

Another advantageous feature of the cable bracket assembly in accordance with the present disclosure also includes that the cable bracket assembly provides an electrical passage through an enclosure to an outside of the enclosure.

Another advantageous feature of the cable bracket assembly in accordance with the present disclosure includes that the cable bracket assembly has the ability to make each individual cable grounding stand-alone from other fiber optic cables. A separate cable bracket assembly may be used for each fiber optic cable such that the fiber optic cables are electrically isolated. That is, the fiber optic cables can be individually grounded from other fiber optic cables within the enclosure for toning purposes.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 18 is a side perspective view of the alternative cable bracket assembly of FIG. 17;

FIG. 19 is an opposite side perspective view of the alternative cable bracket assembly of FIG. 18;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure relates to a cable bracket assembly (e.g., a cable fixation device) arranged and configured to fix a fiber optic cable within an enclosure.

The cable bracket assembly can be arranged and configured to ground components of a fiber optic cable, such as a shield and strength members.

The cable bracket assembly can also be arranged and configured to provide an electrical passage through an enclosure to an outside of the enclosure. In certain examples, the cable bracket assembly also has the ability to make each individual cable grounding stand-alone from other fiber optic cables. A separate cable bracket assembly may be used for each fiber optic cable such that the fiber optic cables are electrically isolated. That is, the fiber optic cables can be individually grounded from other fiber optic cables within the enclosure for toning purposes.

In a typical telecommunications distribution cable (e.g., a central core cable), one or more optical fibers that transmit optical signals are disposed along or parallel to the central longitudinal axis of the cable. The optical fibers can in some examples be surrounded and protected by a non-conductive inner tube coaxial with the cable, the inner tube housing the optical fibers. Surrounding the inner tube is a tubular conductive shield also coaxial with the cable. An exterior tubular insulating jacket also coaxial with the cable surrounds the conductive shield.

Some distribution cables (particularly those of relatively large diameter) also include one or more axial strength members running parallel to the cable's central axis. A typical strength member is a conductive rod, for example metallic. The strength member may run parallel to the cable axis interior to the outer jacket. Distribution cables can be heavy, and the strength members increase the stability and rigidity of the cable.

Figure 1:
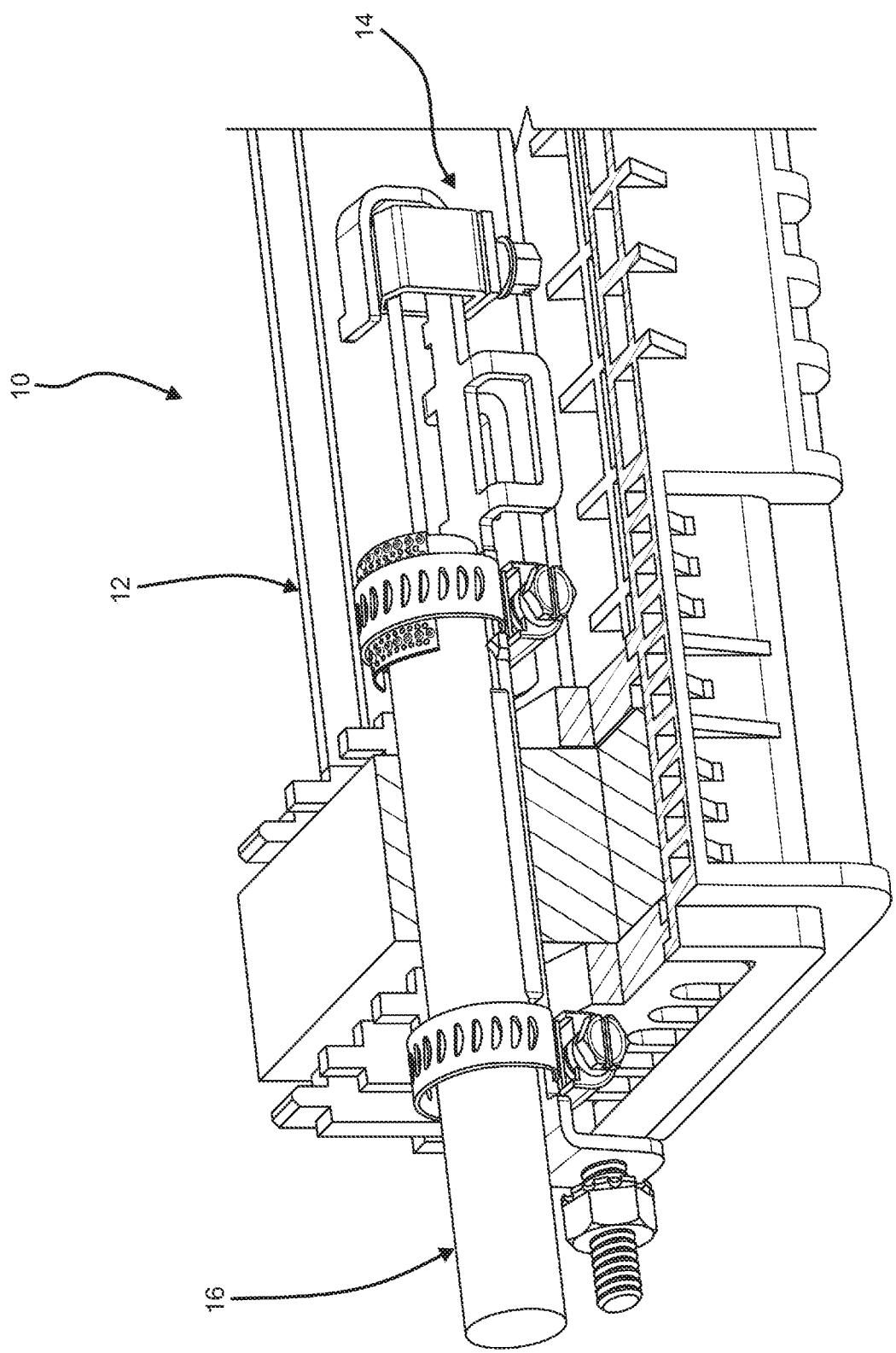
FIG. 1 is a perspective view of an example cable grounding connection system configured in accordance with the present disclosure, the system including an enclosure, a cable bracket assembly, and a fiber optic cable.
Figure 3:
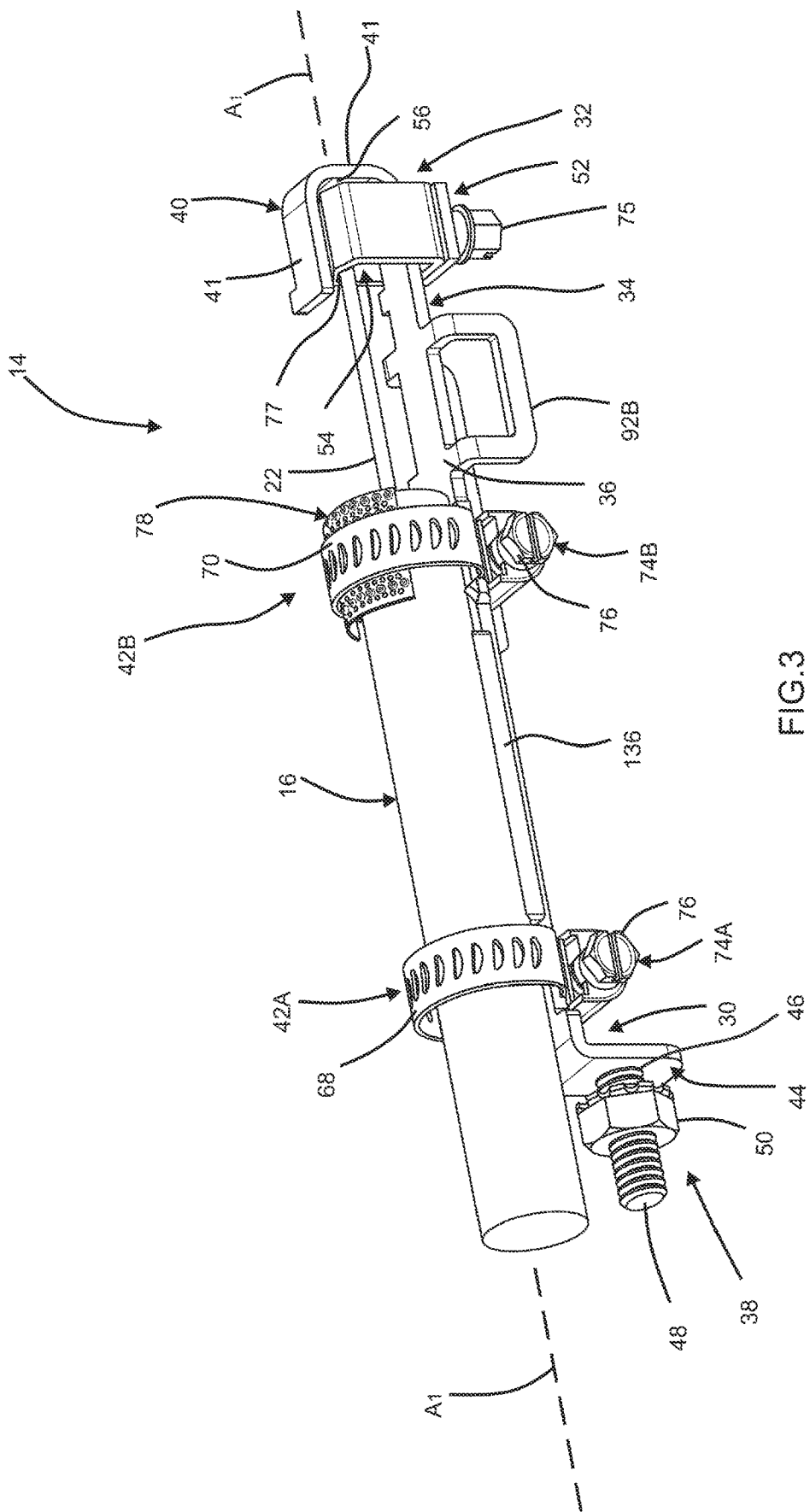
FIG. 3 is a perspective view of the cable bracket assembly and the fiber optic cable of FIG. 1.

Turning to FIG. 1, an example cable grounding connection system 10 is illustrated. The cable grounding connection system 10 can include a telecommunications enclosure 12 and a cable bracket assembly 14 according to the present disclosure. The cable bracket assembly 14 can be fixed within the telecommunications enclosure 12. As depicted, the cable bracket assembly 14 can be attached to a fiber optic cable 16 to establish electrical contact to metallic fiber optic cable components and to secure any strength member contained therein. The fiber optic cable 16 has a central axis $A_1$ (see FIG. 3). One or more optical fibers can run along or parallel to the central axis $A_1$.

Figure 2:
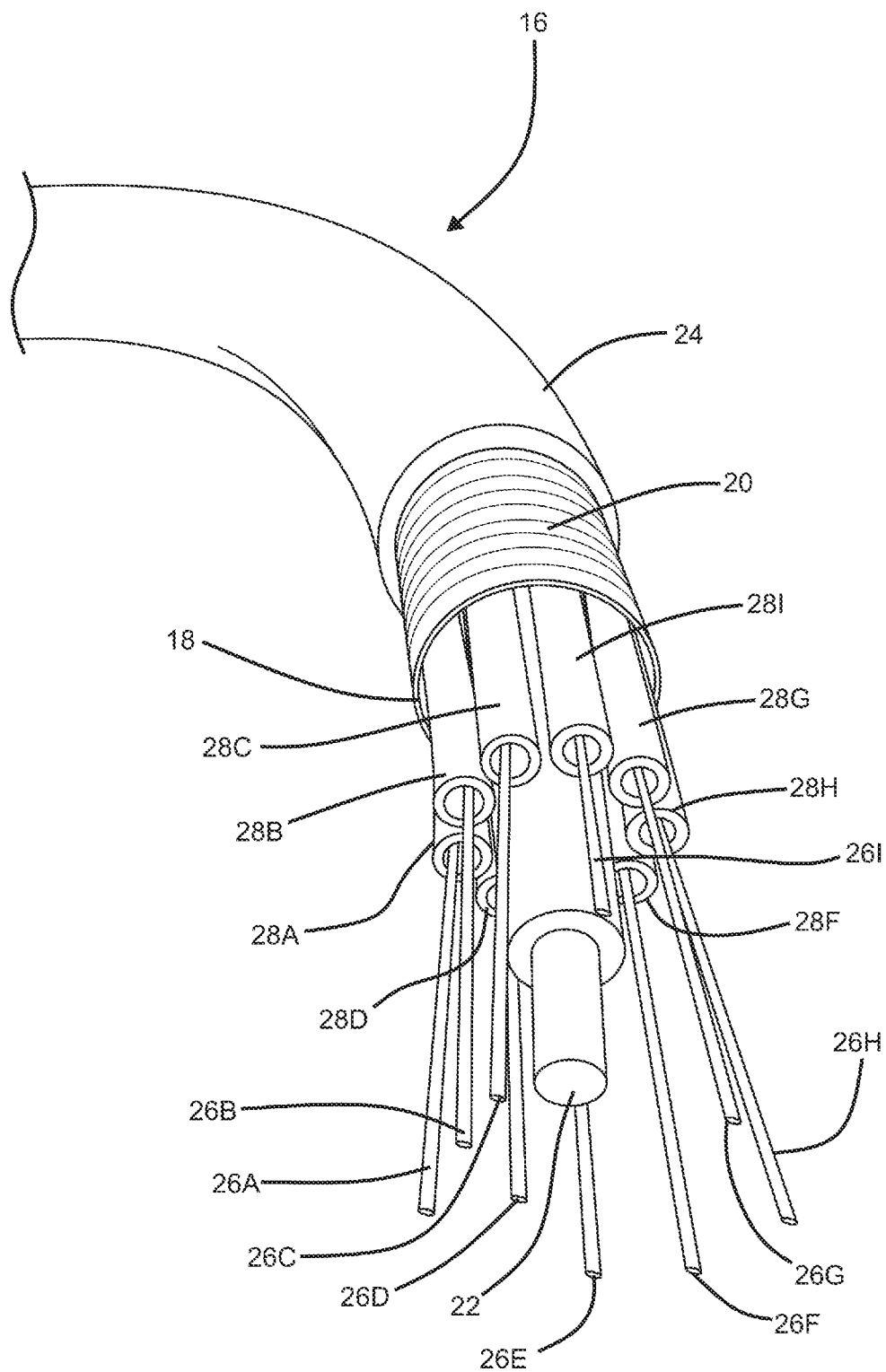
FIG. 2 is a perspective view of the fiber optic cable of FIG. 1.

Turning to FIG. 2, the fiber optic cable 16 includes an interior 18 (e.g., inner most part of the fiber optic cable), a shield 20 surrounding the interior 18, at least one lengthwise extending strength member 22, and a protective jacket 24 surrounding the shield 20 and the strength member 22. In certain examples, the shield 20 may be made from a conductive material. In certain examples, the conductive material is metallic, which may be solid, formed by a braid, or include wires, although alternatives are possible. In certain examples, the conductive material has a corrugated structure, although alternatives are possible. The strength member 22 is preferably metallic, but may also be other materials as well, such as fiberglass reinforced plastic or a polyaramid yarn, such as KEVLAR®. In addition, the strength member 22 may be provided by a stranded bundle of wires or mesh braid, although alternatives are possible. The shield 20 is coaxial with the central axis $A_1$ and surrounds the interior 18. The interior 18 of the fiber optic cable 16 includes a plurality of optical fibers $26_{a-i}$ disposed within protective buffer tubes $28_{a-i}$, respectively.

Although FIG. 2 shows the fiber optic cable 16 including both the shield 20 and the strength member 22, it will be appreciated that the fiber optic cable 16 may be constructed with either the shield 20 or the strength member 22.

The shield 20 that surrounds the interior 18 is preferably corrugated to provide strength and to retain flexibility of the fiber optic cable 16, although alternatives are possible. The strength member 22 runs parallel to the central axis $A_1$ within the protective jacket 24, and provides structural integrity to the fiber optic cable 16. While a single strength member 22 is illustrated, any number of strength members may be accommodated.

The protective jacket 24 surrounding the shield 20 is preferably formed of a durable plastic material, such as polyethylene. In addition, the fiber optic cable 16 is preferably prepared by stripping away a portion of the jacket 24 to expose an end portion of the shield 20 and an end portion of the strength member 22, as shown.

Turning to FIGS. 3-8, multiple views of the cable bracket assembly 14 are illustrated. The cable bracket assembly 14 may be a metal sheet such as aluminum sheeting, although alternatives are possible. In certain examples, the metal sheet may be made out of steel, iron, titanium, or combinations of these or other materials. The cable bracket assembly 14 can include a base member 34 that has a first end 30, and an opposite, second end 32, a grounding attachment interface 38, a strength member fixation mount 40, and first and second cable fixation mounts 42a, 42b.

The strength member fixation mount 40 and the second cable fixation mount 42b may be electrically connected to ground components of a fiber optic cable, such as a strength member and/or a shield.

In certain examples, the strength member fixation mount 40 can be in the shape of a "c-channel" defined by surrounding walls 41, although alternatives are possible.

The strength member fixation mount 40 of the cable bracket assembly 14 can be positioned at the second end 32 of the base member 34. The strength member fixation mount 40 can include a clamping member 52 that is adapted to engage with and fix the strength member 22 when the fiber optic cable 16 is attached to the cable bracket assembly 14. The clamping member 52 has an interior region 54 (e.g., pocket) in which free ends of the strength member 22 can pass through and be received therein. In certain examples, an end point of the strength member 22 may contact an interior surface 56 of the strength member fixation mount 40 when the strength member 22 is fixed to the strength member fixation mount 40.

The strength member fixation mount 40 can be made from an electrically conductive material. In other examples, the strength member fixation mount 40 need not be electrically conductive. The strength member 22 can be in electrical contact with the strength member fixation mount 40 and, in turn, the clamping member 52 is secured, e.g., with a fastener 75, to the base member 34 adjacent the strength member fixation mount 40, such that the clamping member 52 is mechanically connected to the strength member 22.

The fastener 75, such as a bolt, may be used to move the clamping member 52 relative to the base member 34 to clamp or fix the strength member 22 within the strength member fixation mount 40.

The fastener 75 may also be used to electrically connect the cable bracket assembly 14 to a grounding wire or a conductive plate. In certain examples, the grounding wire can be routed out of an enclosure or product through one of the cable ports at the cable entry. Each one of the cable bracket assemblies 14 can be grounded individually so that each cable can stand-alone or be isolated from other cables. An electrical passage can be provided to the outside of an enclosure to provide outside accessibility without needing to open the enclosure or product.

In certain examples, a conductive plate or other structure can be used to electrically connect multiple cable bracket assemblies 14 together at the grounding attachment interface 38 so that one grounding wire can be used to ground all of the cable bracket assemblies 14.

Figure 4:
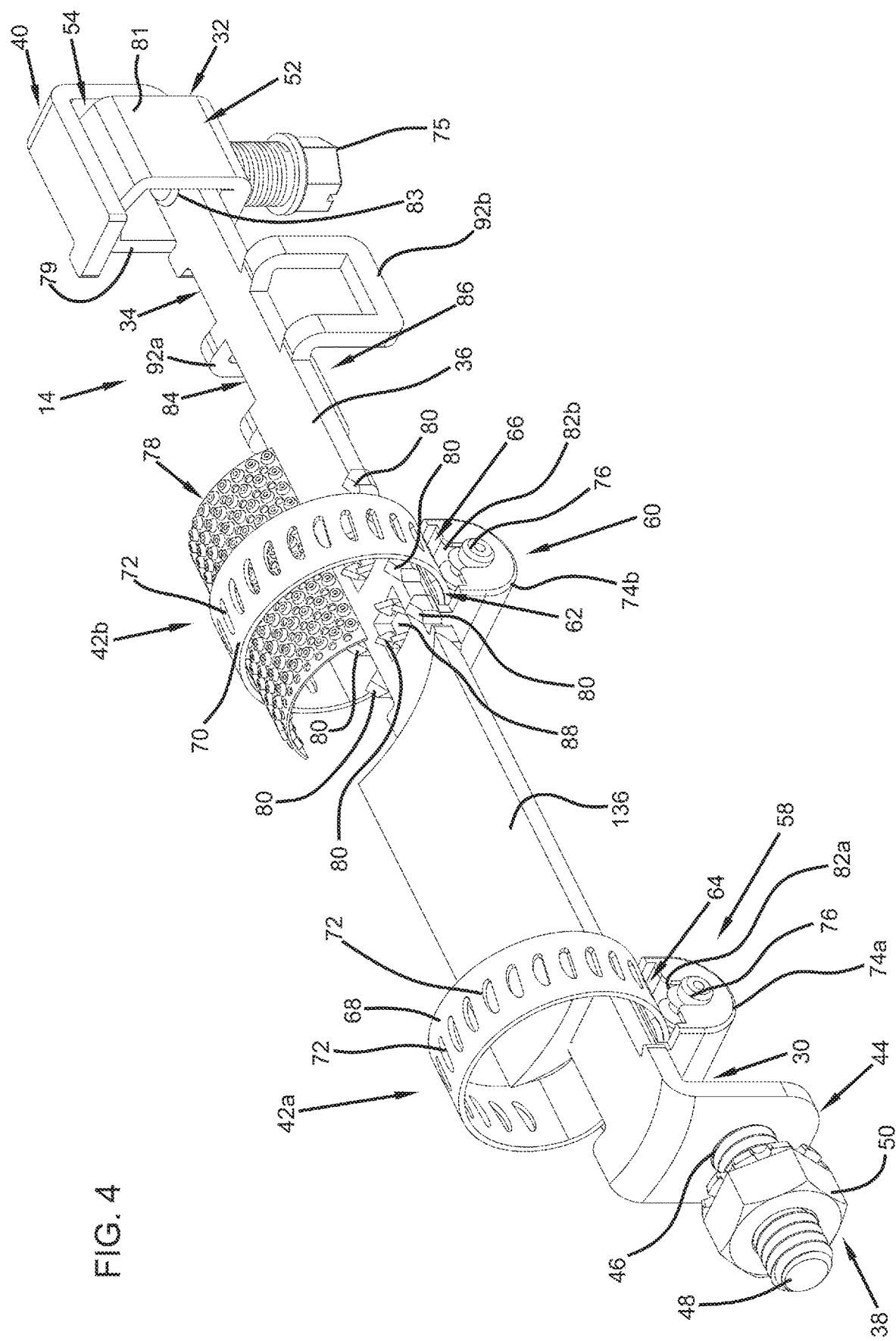
FIG. 4 is a perspective view of the cable bracket assembly of FIG. 3.
Figure 5:
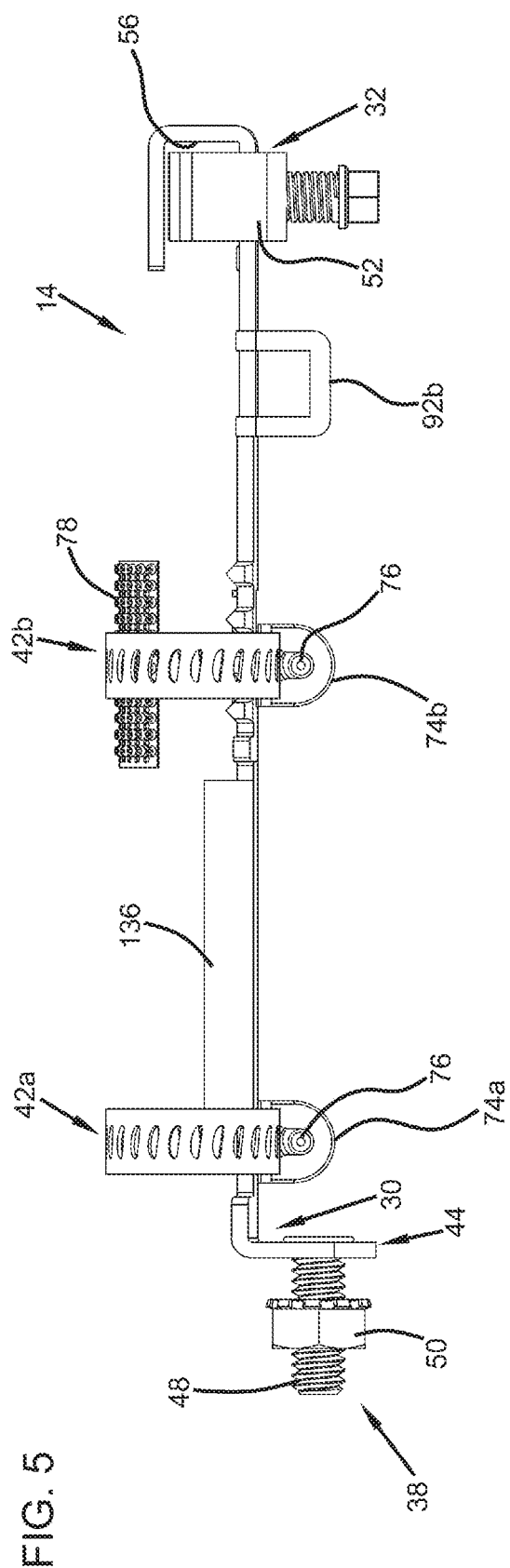
FIG. 5 is a side view of the cable bracket assembly of FIG. 3.
Figure 6:
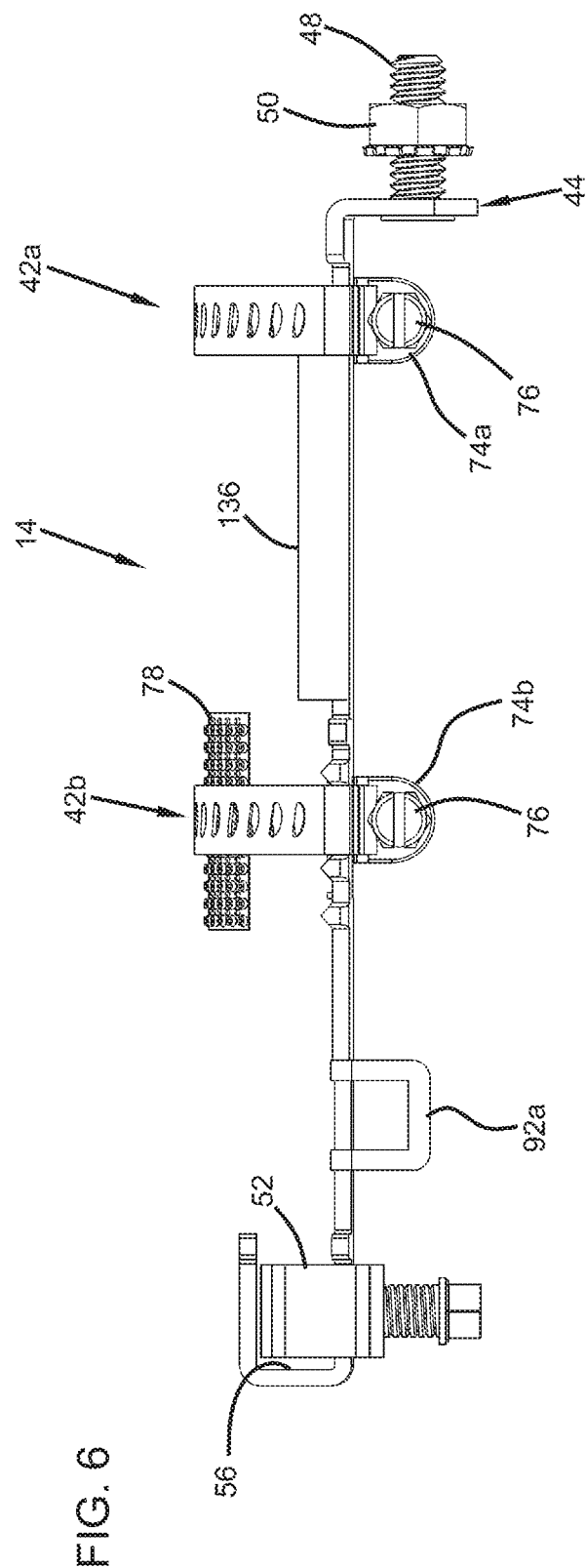
FIG. 6 is an opposite side view of the cable bracket assembly of FIG. 5.
Figure 7:
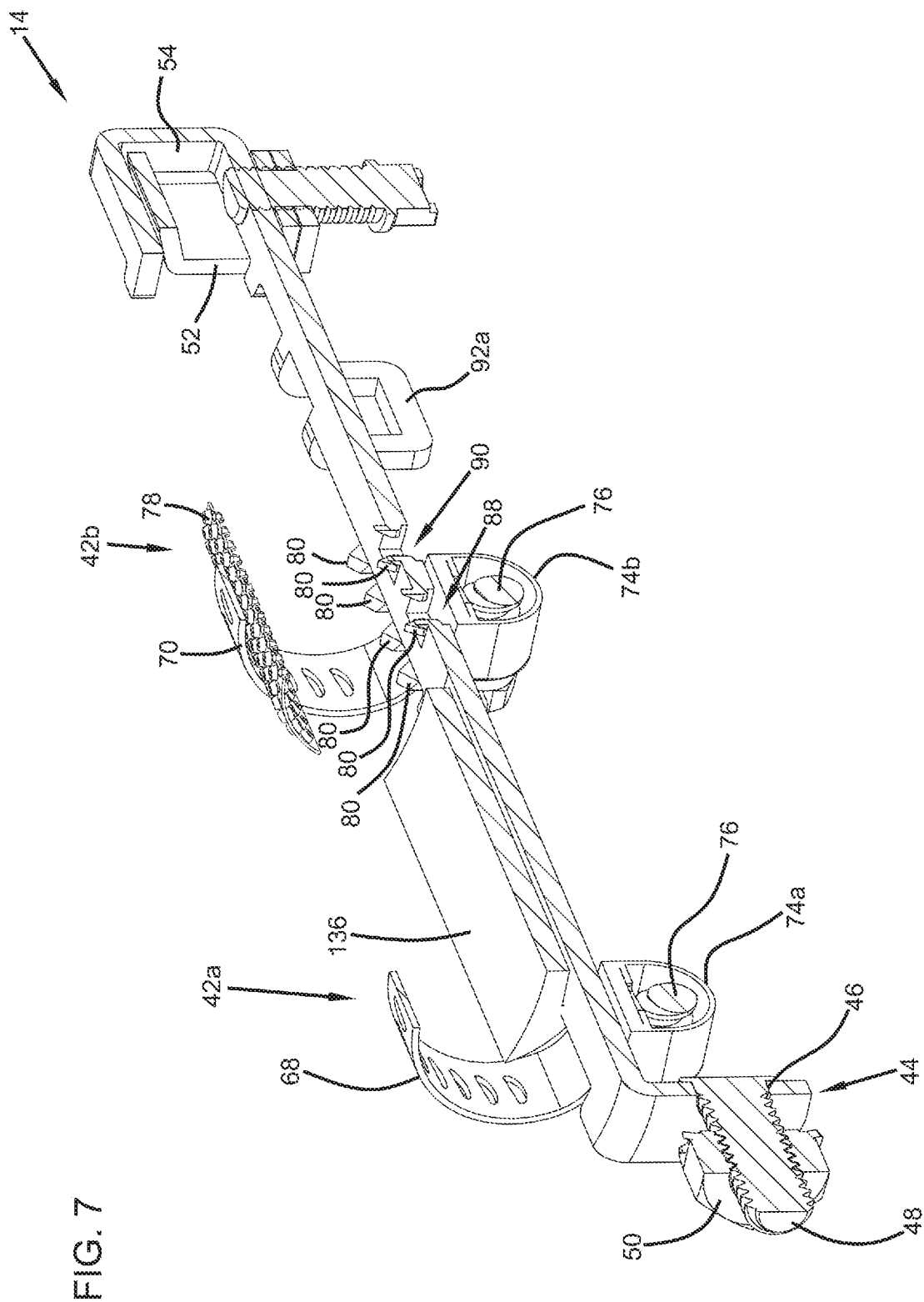
FIGS. 7-8 are multiple cross-sectional perspective views of the cable bracket assembly of FIGS. 4-6.
Figure 8:
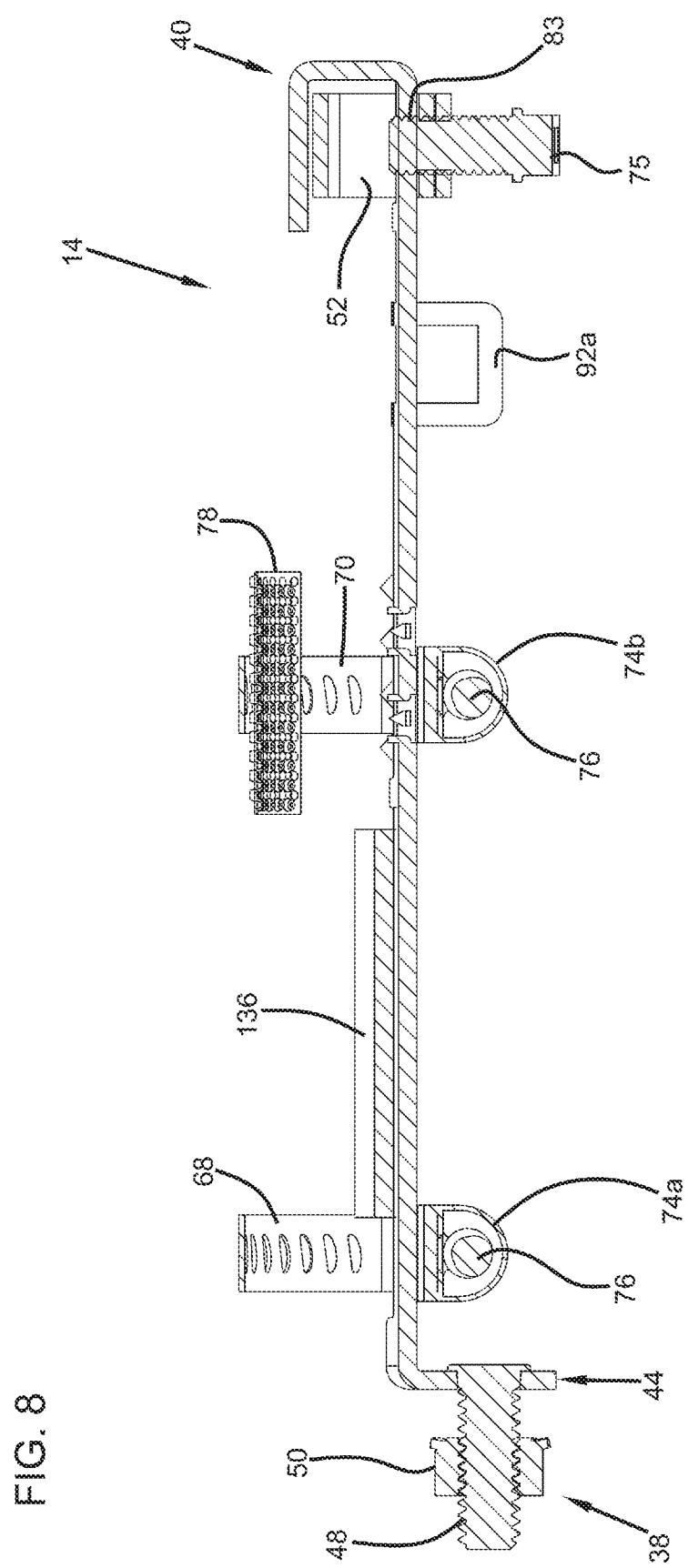

Turning to FIG. 4, the clamping member 52 can be secured to the base member 34, e.g., by being screwed on using a threaded bolt extending through a threaded hole 83 defined in the base member 34, the threaded hole 83 configured to receive fastener 75, e.g., a bolt, for securing and/or adjusting the position of the clamping member 52 of the strength member fixation mount 40 relative to the base member 34. In certain examples, the strength member 22 can be positioned within a cavity 77 (see FIG. 3) defined by extension members 79, 81 of the clamping member 52.

In certain examples, an electrical connection can be established by the strength member fixation mount 40 to the strength member 22 of the fiber optic cable 16. The strength member fixation mount 40 can be arranged and configured to provide grounding. The clamping member 52 can be constructed of an electrically conductive material to provide a grounding contact. The cable bracket assembly 14 is arranged and configured to mount within the enclosure 12.

The cable bracket assembly 14 includes a bracket first portion 58 having at least one feature, the first cable fixation mount 42a, for securing the fiber optic cable 16 to the cable bracket assembly 14 and a bracket second portion 60 having at least one feature, the second cable fixation mount 42b, for securing the fiber optic cable 16 to the cable bracket assembly 14. In certain examples, the bracket first portion 58 can be positioned adjacent to the first end 30 of the base member 34. The bracket second portion 60 can be positioned generally at a midpoint 62 located between the first and second ends 30, 32 of the base member 34 of the cable bracket assembly 14.

In certain examples, the first and second cable fixation mounts 42a, 42b can be arranged and configured to align and fix the fiber optic cable 16 relative to the telecommunications enclosure 12. In one example, the first cable fixation mount 42a includes a first tunnel 64 (e.g., through hole or channel) formed in the bracket first portion 58. Likewise, the second cable fixation mount 42b includes a second tunnel 66 (e.g., through hole or channel) formed in the bracket second portion 60. In the example depicted, a first cable clamp 68 (e.g., first strap) is passed through the tunnel 64 of the bracket first portion 58, and a second cable clamp 70 (e.g., second strap) is passed through the tunnel 66 of the bracket second portion 60, although alternative fixing structures are possible.

The first and second cable clamps 68, 70 can be expanded and contracted through the use of actuation structures. The actuation structures can include the first and second tunnels 64, 66 through which the first and second cable clamps 68, 70 extend. The first and second cable clamps 68, 70 are preferably flat straps with a rectangular cross section oriented to lie flat against the fiber optic cable 16 during use. The first and second cable clamps 68, 70 may be made of metal. The first and second cable clamps 68, 70 preferably take the form of hose clamps or band clamps having a plurality of slots or shaped openings 72. In other examples, the cable clamps 68, 70 may include a cable tie.

First and second cable anchors 74a, 74b (e.g., fastener) which comprise a screw 76 having threads can be used to shorten or lengthen the loop enclosed by the first and second cable clamps 68, 70 and the first and second cable anchors 74a, 74b when the screw 76 is rotated. The first cable anchor 74a is provided at the first end 30 of the base member 34 for anchoring (e.g., securing, attaching, fixing, etc.) cables to the base member 34. The second cable anchor 74a is provided generally at the midpoint 62 between the first and second ends 30, 32 of the base member 34 of the cable bracket assembly 14 for anchoring the fiber optic cable 16 to the base member 34.

In certain examples, the first and second cable anchors 74a, 74b feature a drive screw (e.g., a set screw) to allow the first and second cable clamps 68, 70 to be tightened by advancing the drive screw clockwise. The threads of the screws 76 engage slots 72 in the first and second cable clamps 68, 70. By turning the screws 76 in a first direction, the diameters of the first and second cable clamps 68, 70 are enlarged. By turning the screws in an opposite second direction, the diameters of the first and second cable clamps 68, 70 are reduced. By placing cables though the first and second cable clamps 68, 70 and then constricting the diameters of the first and second cable clamps 68, 70 by turning the screws 76, the cables can be clamped to the cable bracket assembly 14. By loosening the screw 76 slightly counter-clockwise, the screw 76 may be retracted away from the first and second cable clamps 68, 70, which instantly releases the first and second cable clamps 68, 70 for removal or repositioning. The first and second cable anchors 74a, 74b allow for quick and easy installation.

The first and second cable clamps 68, 70 preferably comprise a single, continuous piece of material, preferably steel. The first and second cable clamps 68, 70 have sufficient length to encircle the fiber optic cable 16 during use. The first and second cable clamps 68, 70 connect the cable bracket assembly 14 to the fiber optic cable 16 by pulling the fiber optic cable 16 against the cable bracket assembly 14 as the first and second cable clamps 68, 70 pass through respective tunnels 64, 66 in the bracket first portion 58 and bracket second portion 60. The tunnels 64, 66 can be arranged and configured to conform to the shape of the first and second cable clamps 68, 70 which are preferably flat straps having a generally rectangular cross section, and thus the tunnels 64, 66 can be rectangular and sized larger than the first and second cable clamps 68, 70 to allow easy passage of the first and second cable clamps 68, 70 through the tunnels 64, 66.

The first and second cable clamps 68, 70 can comprise a bendable strip made from a conductive material. The first and second cable clamps 68, 70 can form a loop which size can be adjustable based on the size of a fiber optic cable to be clamped to the cable bracket assembly 14. The first and second cable anchors 74a, 74b can be respectively placed through respective cavities 82a, 82b of the first and second cable fixation mounts 42a, 42b to thereby secure and tighten the first and second cable clamps 68, 70 around the fiber optic cable 16.

In certain examples, the second cable clamp 70 can make electrical contact with the shield 20 of the fiber optic cable 16 to provide a grounding contact with the fiber optic cable 16. In certain examples, a grounding conductor 78 can be placed in electrical contact with shield 20 of the fiber optic cable 16. The second cable clamp 70 can be arranged and configured to hold the grounding conductor 78 onto the shield 20 and thereby ensure electrical contact between the fiber optic cable 16 and the grounding conductor 78.

The grounding conductor 78 can be any flexible conductor. In the example shown, the grounding conductor 78 is a conductive mesh braid, e.g., mesh copper braid, although alternatives are possible. Conductive braids are typically flexible, allowing the braids to be folded and positioned easily. The grounding conductor 78 electrically connects the cable bracket assembly 14 to the fiber optic cable 16.

In some examples, to help establish and/or maintain a mechanical contact between the shield 20 and the grounding conductor 78, metal cable sheath fixations (e.g., metal barbs, toothed elements) 80 can be positioned on the base member 34 of the cable bracket assembly 14. In certain examples, the metal cable sheath fixations 80 can be placed adjacent or at the midpoint 62 of the fiber optic cable bonding assembly 14.

The metal cable sheath fixations 80 can be made from electrically conductive material and can be configured as a plurality of teeth projecting from the base member 34. In certain examples, the metal cable sheath fixations 80 may be made from a thin, stainless steel material, although alternatives are possible.

In the illustrated example, the metal cable sheath fixations 80 may be integrally formed with the base member 34 by a stamping operation, as would be readily understood by those skilled in the art, although alternatives are possible.

In the example shown, the metal cable sheath fixations 80 project in parallel longitudinal rows on opposite first and second sides 84, 86 of the base member 34. In certain examples, the metal cable sheath fixations 80 can be arranged and configured to project from within first and second apertures 88, 90 defined in the base member 34. One or more teeth of the metal cable sheath fixations 80 can be arranged and configured to pierce a non-conductive protective film covering the metallic shield 20, and in that manner, bite into the metallic shield 20 to establish or enhance connection between the metallic shield 20 of the fiber optic cable 16 and the grounding conductor 78. The cable bracket assembly 14 can provide an electrical passage that extends to outside of the enclosure 12 to the grounding attachment interface 38.

The cable bracket assembly 14 can include first and second U-shaped arms 92a, 92b that are arranged and configured to interface with an enclosure. The first U-shaped arm 92a extends downwardly from a body 36 of the base member 34 at the first side 84 thereof. The second U-shaped arm 92b extends downwardly from the body 36 of the base member 34 at the second side 86 thereof. The first and second U-shaped arms 92a, 92b may be a unitary part of the base member 34. The first and second U-shaped arms 92a, 92b may be adapted to mount the cable bracket assembly 14 within an enclosure 12. In certain examples, the first and second U-shaped arms 92a, 92b allow the cable bracket assembly 14 to be in snap-fit engagement with the enclosure 12.

In certain examples, the first and second U-shaped arms 92a, 92b can be mounted to the enclosure 12 by a friction fit. In certain examples, the configuration of the first and second U-shaped arms 92a, 92b provides a floating bracket to enclosure interface. That is, the cable bracket assembly 14 may not be fixed within the enclosure 12. In other examples, the first and second U-shaped arms 92a, 92b can be configured (e.g., can include suitably sized slots, fingers, pockets, receptacles, or the like) for mounting the cable bracket assembly 14 within the enclosure 12.

In certain examples, the base member 34 may have a longitudinal body 36 that extends between the first and second ends 30, 32. The cable bracket assembly 14 can include a grounding attachment interface 38 that is located at the first end 30 of the base member 34. The grounding attachment interface 38 may include a 90° elbow 44 extending downwardly from the body 36 of the base member 34. It is to be understood that varying degrees can be used for an elbow. The elbow 44 defines a hole 46 (e.g., opening, aperture) therethrough for receiving a stud 48 such that the stud 48 extends radially outwardly therefrom. A nut 50 can be secured on a threaded end of the stud 48.

The base member 34 is configured to pass through a port of an enclosure such that at least a portion of the base member 34 remains outside of the enclosure when the cable bracket assembly 14 is fixed within the enclosure. For example, the stud 48 and the grounding attachment interface 30 can both remain outside of the enclosure. A threaded portion of the stud 48 can be attached to a grounding terminal.

One advantage to having the grounding attachment interface 38 positioned outside of an enclosure is that such configuration provides accessibility to the grounding attachment interface 38 without having to enter the enclosure. An enclosure may have multiple ports. A separate cable bracket assembly 14 with a base member 34 can pass through each port respectively. That is, each cable bracket assembly 14 can be properly aligned with a respective port of an enclosure as depicted in FIG. 1. As such, the cable bracket assembly 14, in accordance with the present disclosure, has the ability to make each individual cable grounding stand-alone from other fiber optic cables. That is, the fiber optic cables can be electrically isolated and individually grounded from other fiber optic cables within an enclosure.

In certain examples, the grounding attachment interface 38 can be arranged and configured to provide grounding of an enclosure and to provide outside accessibility for toning (i.e., locating buried underground cable).

Figure 9:
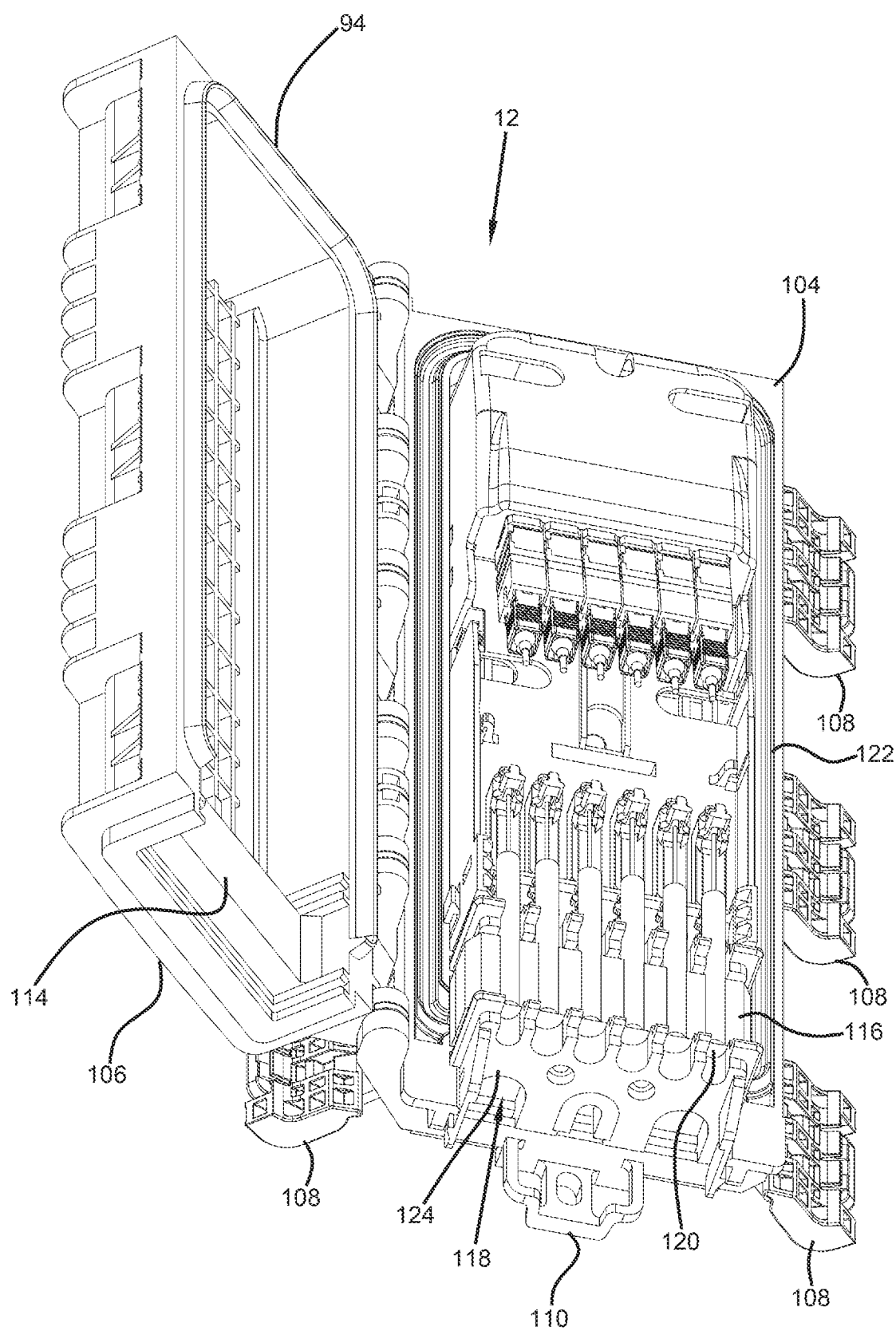
FIG. 9 is a front perspective view of an example telecommunications enclosure configured in accordance with the present disclosure; the telecommunications enclosure having a housing with a cover shown open relative to a base to expose a management unit.
Figure 10:
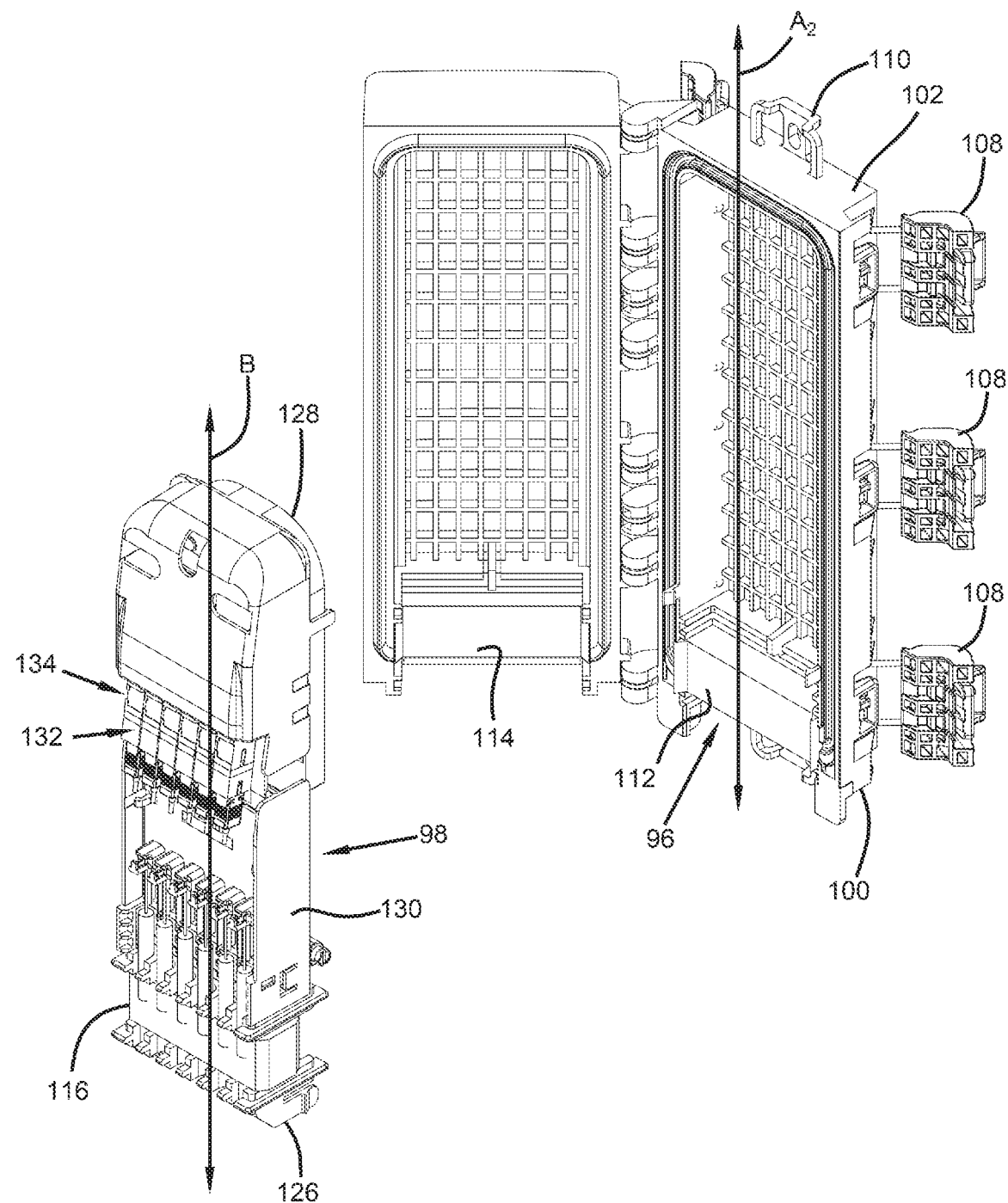
FIG. 10 shows the management unit of FIG. 9 exploded out from the housing of FIG. 9.

Referring to FIGS. 9-10, the example telecommunications enclosure 12 includes a housing 94, a sealing arrangement 96 for sealing the housing 94, and a management unit 98 that mounts within the interior of the housing 94. The housing 94 is elongate along a major axis $A_2$ of the housing 94. The major axis $A_2$ extends along a length of the housing 94 between first and second opposite ends 100, 102.

The housing 94 includes a base 104 and a cover 106 that cooperate to define an interior of the housing 94. The cover 106 is pivotally connected to the base 104 and is pivotally movable relative to the base 104 between an open position and a closed position. In an example, the hinge axis of the housing 94 is parallel to the major axis $A_2$ of the housing 94. In other examples, the hinge may have a slide feature which allows the pivot axis to slide/move relative to the base so that the cover can be staged above the base prior to latching. This type of configuration allows a perimeter seal of the housing to be evenly compressed at both the hinge side and the opposite side when the housing is latched closed. A suitable sliding hinge configuration is disclosed at FIGS. 18-30 of PCT Publication No. WO2017/046187, which is hereby incorporated by reference in its entirety. In other examples, the hinge may be a separate mountable hinge of the type disclosed in PCT Patent Application No. US2019/036713, filed Jun. 12, 2019, entitled "TELECOMMUNICATIONS ENCLOSURE WITH A SEPARATE MOUNTABLE HINGE", which application is hereby incorporated by reference in its entirety.

In certain examples, latches 108 are spaced about a perimeter of the housing 94 to clamp the cover 106 in the closed position. The cover 106 defines a front of the housing 94 and the base 104 defines a rear of the housing 94.

In certain implementations, the housing 94 includes mounting structure 110 to hold (e.g., attach) the housing 94 to a pole, wall, or other surface. The sealing arrangement 96 seals the housing 94. The sealing arrangement 96 includes a rear gel volume 112 mounted in the base 104 (e.g., molded into the base), a front gel volume 114 mounted in the cover 106 (e.g., molded into the cover), and an intermediate gel volume 116 positioned between the front and rear gel volumes 114, 112. A first cable entry location 118 (e.g., port) can be defined between the rear gel volume 112 and the intermediate gel volume 116 and a second cable entry location 120 defined between the front gel volume 114 and the intermediate gel volume 116. The sealing arrangement 96 also includes a perimeter seal 122 that extends about a perimeter of the housing 94 for sealing between the cover 106 and the base 104.

In certain examples, the enclosure 12 includes inner and outer gel containment walls 124 between which the front, rear, and intermediate gel volumes 114, 112, 116 are positioned and axially contained. The management unit 98 mounts within the interior of the housing 94. In one example, the management unit 98 is latched in the housing 94 by a snap-fit latching arrangement. The management unit 98 is elongate along a major axis B that is parallel to the major axis $A_2$ of the housing 94 when the management unit 98 is mounted within the interior of the housing 94. The major axis B of the management unit 98 extends along a length of the management unit 98 between a first end 126 and an opposite second end 128 of the management unit 98. The first end 126 of the management unit 98 is positioned adjacent to the first end 100 of the housing 94 when the management unit 98 is mounted within the housing 94. The second end 128 of the management unit 98 is positioned at the second end 102 of the housing 94 when the management unit 98 is mounted within the housing 94.

The management unit 98 may include a tray 130, splice mounting components, and a bank of adapters 132 mounted at an adapter mounting location 134. An example enclosure having a management unit and an example sealing arrangement is disclosed in PCT Patent Application No. US2019/017904, filed Feb. 13, 2019, entitled "SEALED CLOSURE WITH FIBER OPTIC ORGANIZER", now published as WO 2019/160995, which application is hereby incorporated by reference in its entirety.

In certain examples, the cable bracket assembly 14 may include an intermediate seal 136 positioned between the fiber optic cable 16 and the base member 34. The intermediate seal 136 may be made from a gel type material or a silicone rubber material, although alternatives are possible. The intermediate seal 136 can be positioned between the first and second cable fixation mounts 42a, 42b of the cable bracket assembly 14. The intermediate seal 136 provides a seal between the fiber optic cable 16 and the base member 34 to facilitate the electrical passage to the outside of an enclosure.

Figure 11:
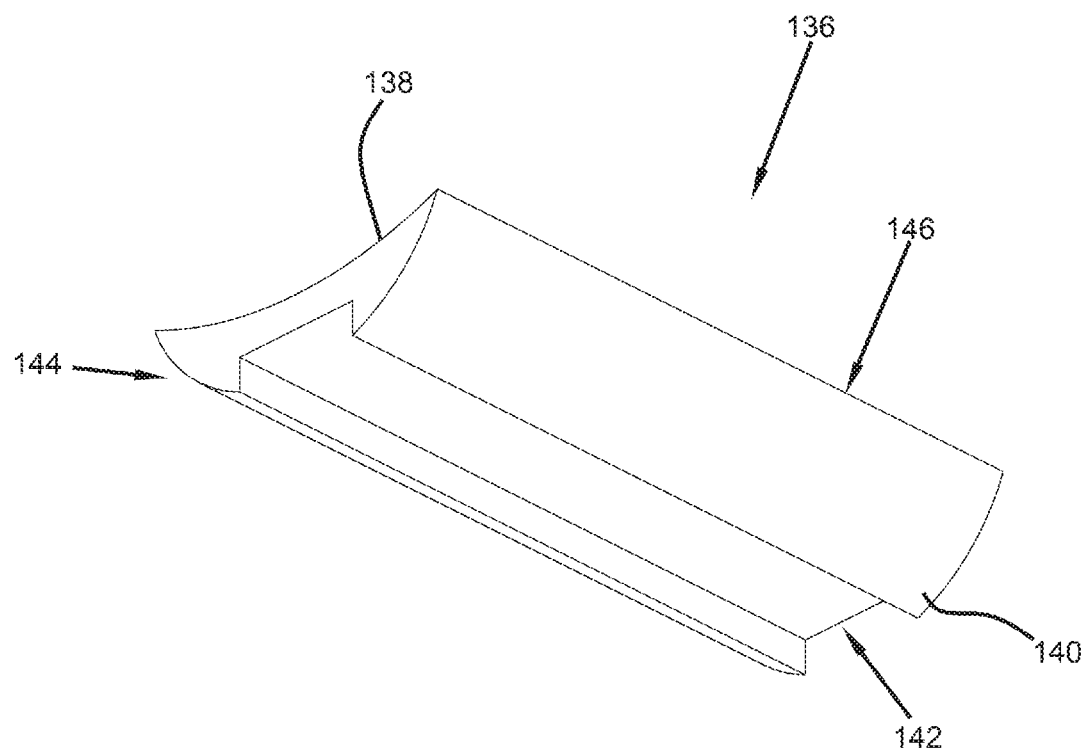
FIG. 11 is a bottom perspective view of an intermediate seal that can be used with the cable bracket assembly of FIG. 1 in accordance with the present disclosure.
Figure 12:
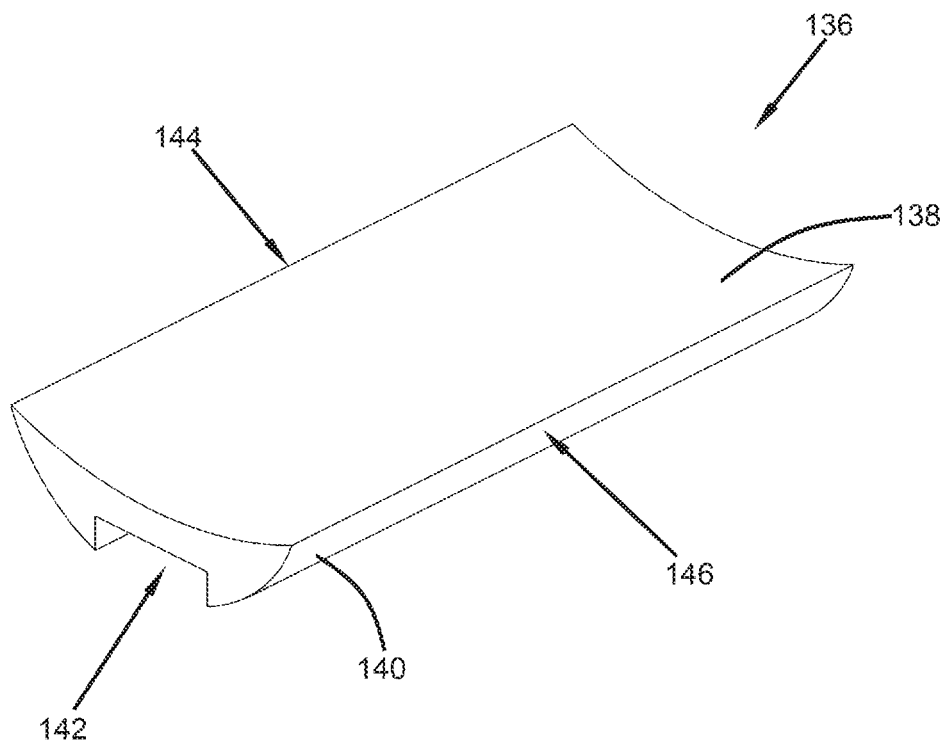
FIG. 12 is a top perspective view of the intermediate seal of FIG. 11.

Turning to FIGS. 11-12, the intermediate seal 136 is depicted with a top 138 and a bottom 140. In certain examples, the bottom 140 of the intermediate seal 136 can define a channel 142 (e.g., recess, notch, slot, or the like). When the intermediate seal 136 is mounted on the base member 34 of the cable bracket assembly 14, a portion of the base member 34 can be received within the channel 142 of the intermediate seal 136, although alternatives are possible. In the example depicted, the top 138 of the intermediate seal 136 may have an arch, bow, concave, or curve shape to support and seal a fiber optic cable thereon. That is, the intermediate seal 136 may be configured with opposing sides 144, 146 that curve upwardly to create the bow shape. The curved configuration may enhance the sealing engagement between the fiber optic cable 16 and the base member 34 of the cable bracket assembly 14, although alternatives are possible. The shape of the top 138 of the intermediate seal 136 may aid in retaining the fiber optic cable 16 in alignment position with the enclosure. One advantageous feature is that leakage points can be avoided due to the cable bracket assembly 14 passing through the intermediate seal 136.

Figure 13:
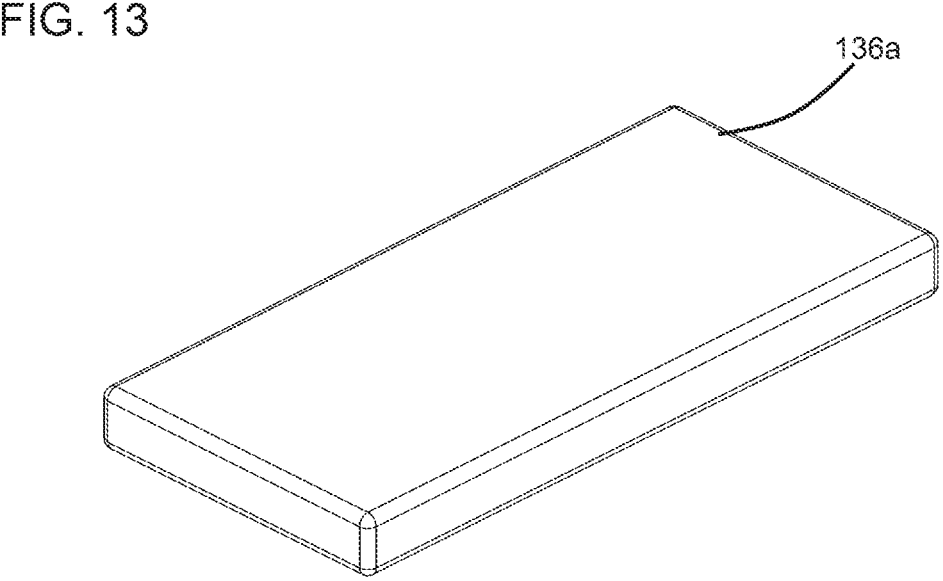
FIG. 13 is a perspective view of an alternative intermediate seal in accordance with the present disclosure.
Figure 14:
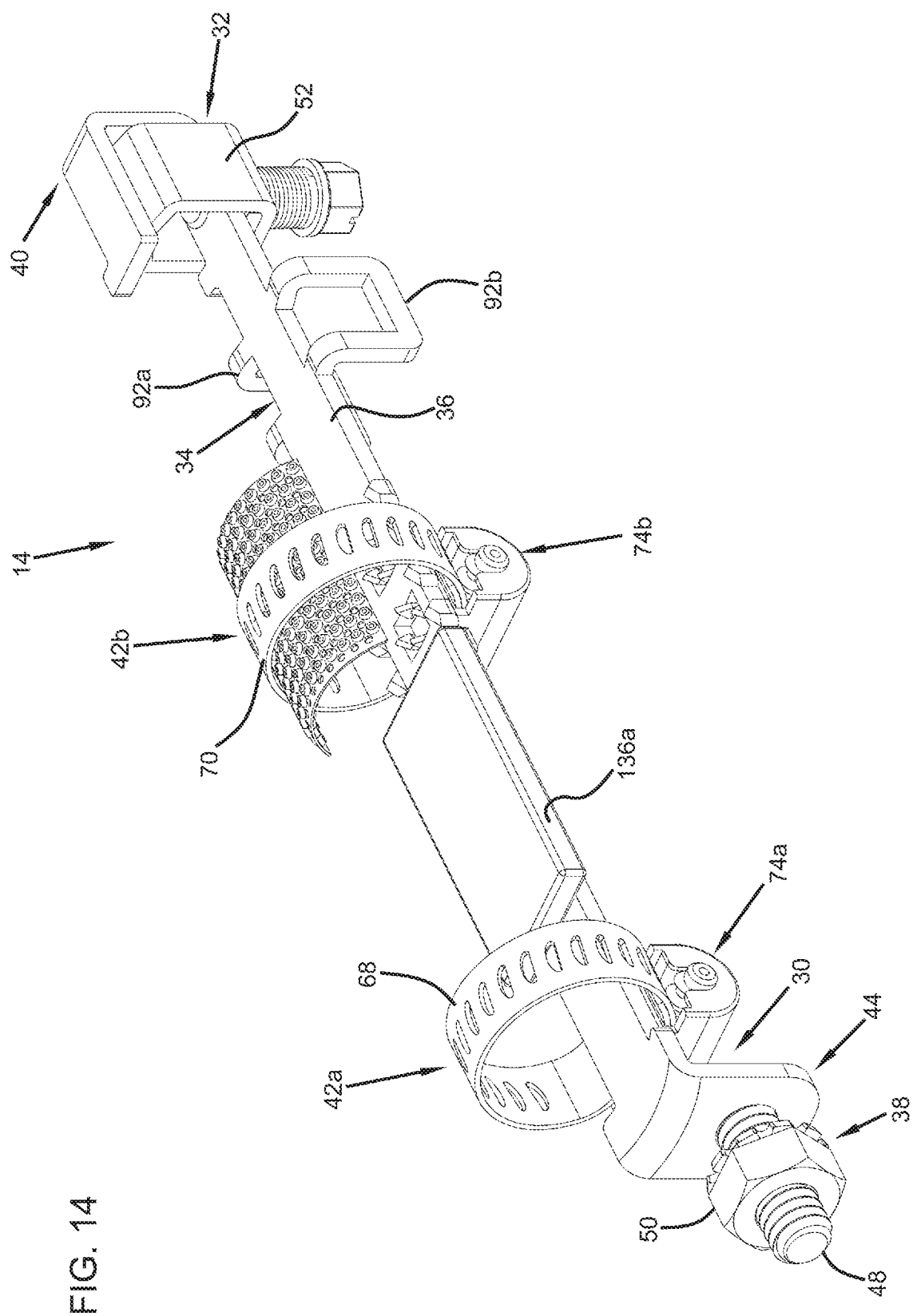
FIG. 14 is a perspective view of the cable bracket assembly of FIG. 4 with the intermediate seal of FIG. 13 positioned thereon.
Figure 15:
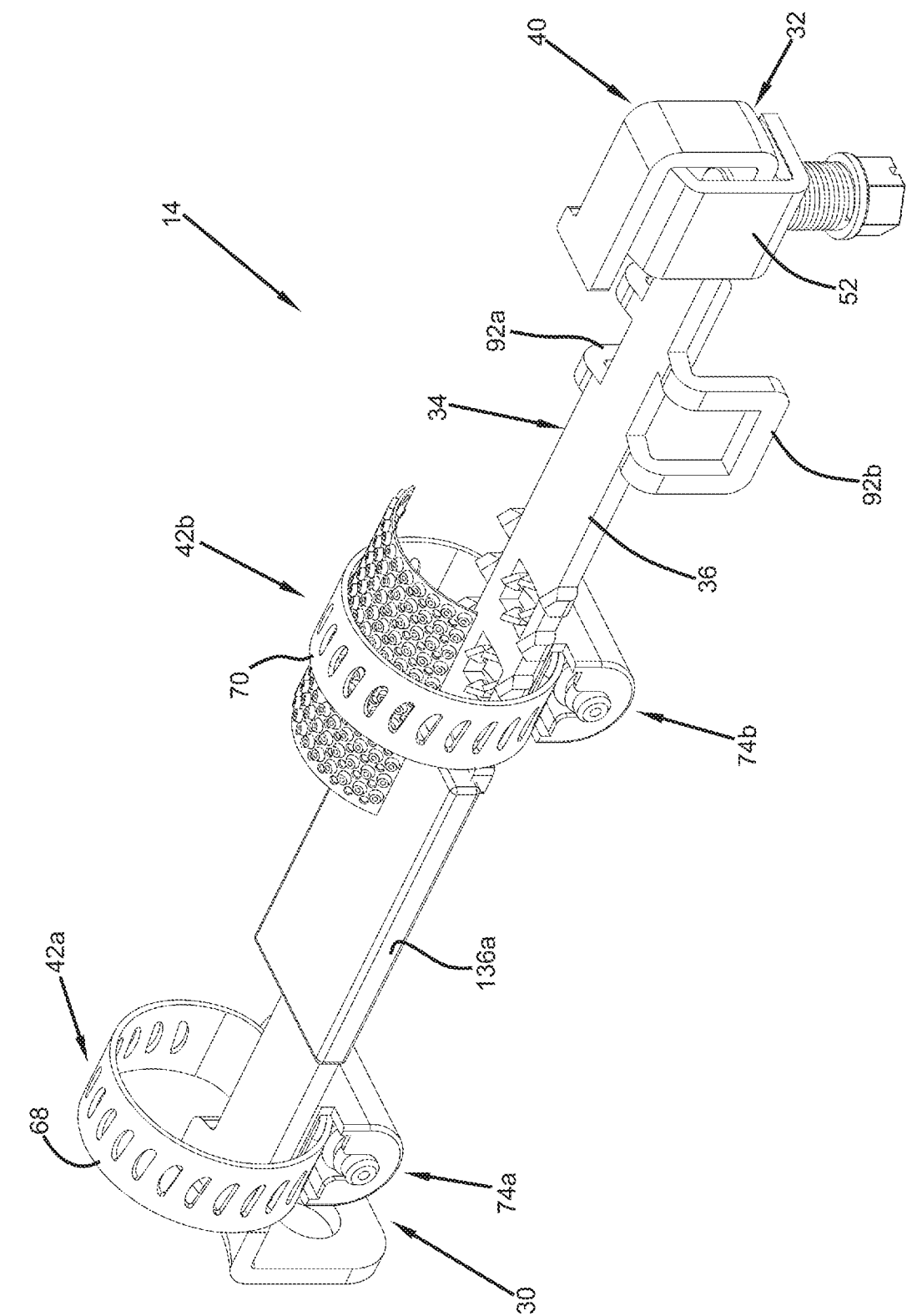
FIG. 15 is another perspective view of the cable bracket assembly of FIG. 14.
Figure 16:
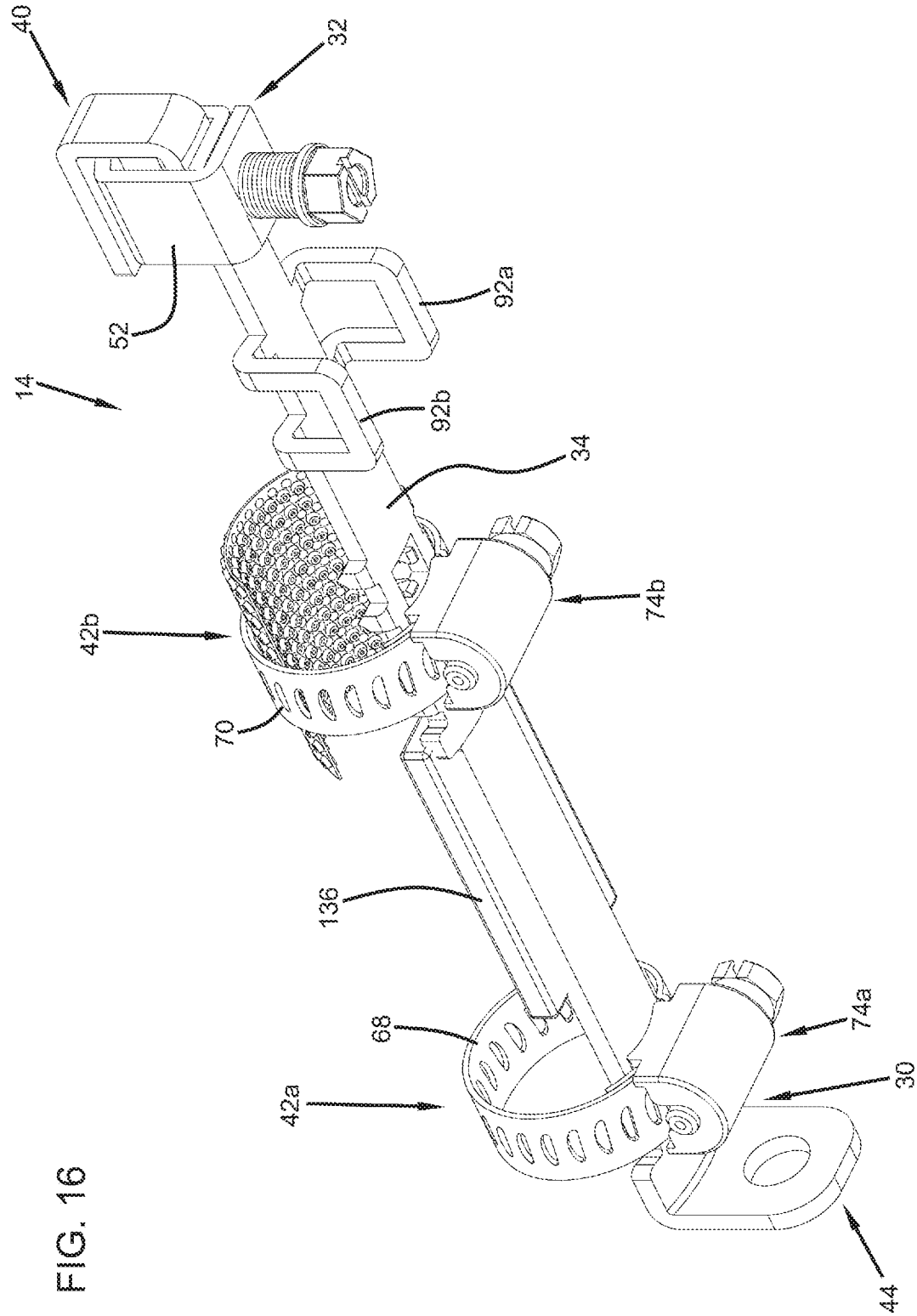
FIG. 16 is a bottom perspective view of the cable bracket assembly of FIG. 14.
Figure 17:
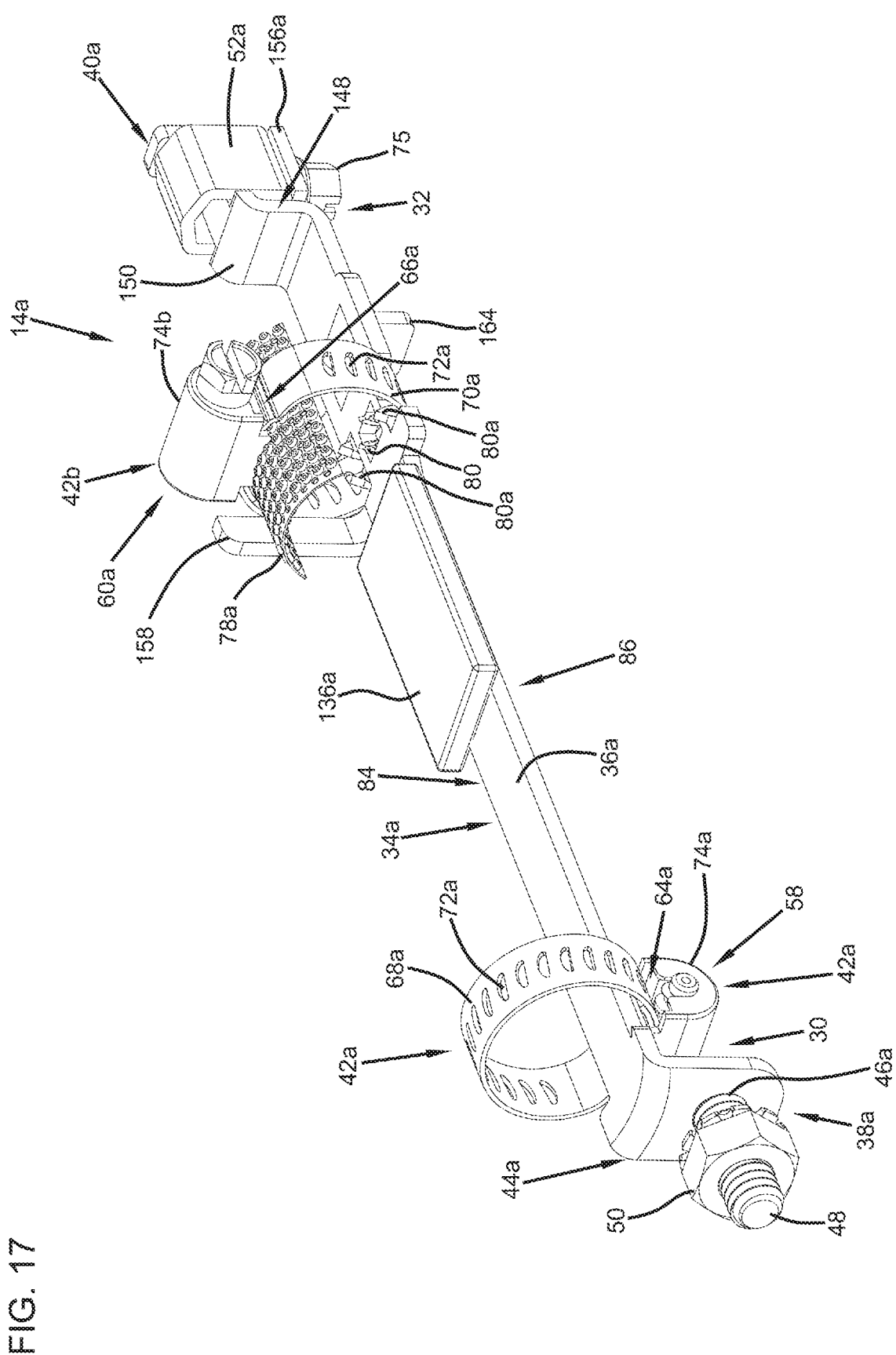
FIG. 17 is a perspective view of an alternative cable bracket assembly in accordance with the present disclosure.
Figure 20:
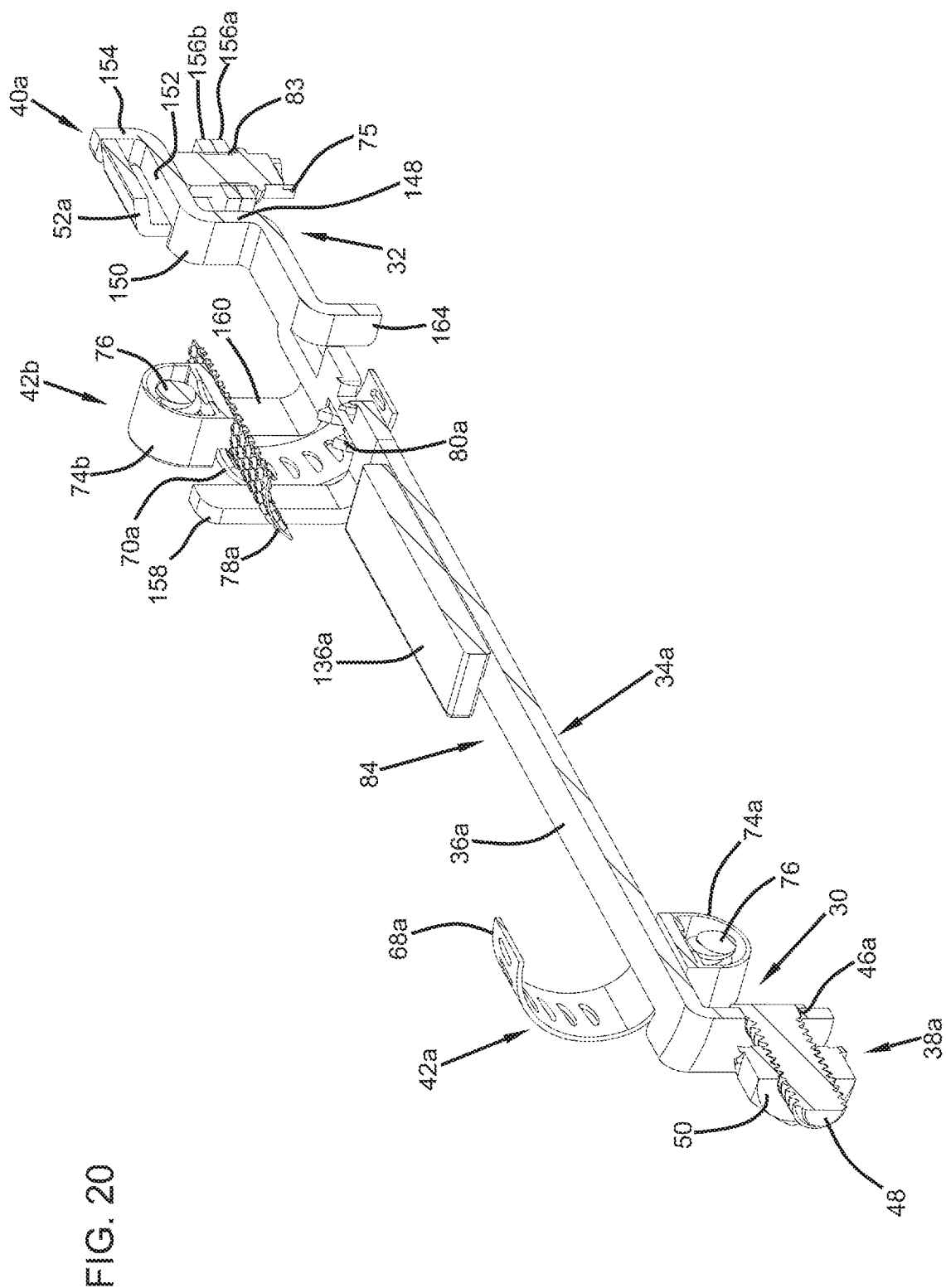
FIG. 20 is a cross-sectional perspective view of the cable bracket assembly of FIGS. 17-19.
Figure 21:
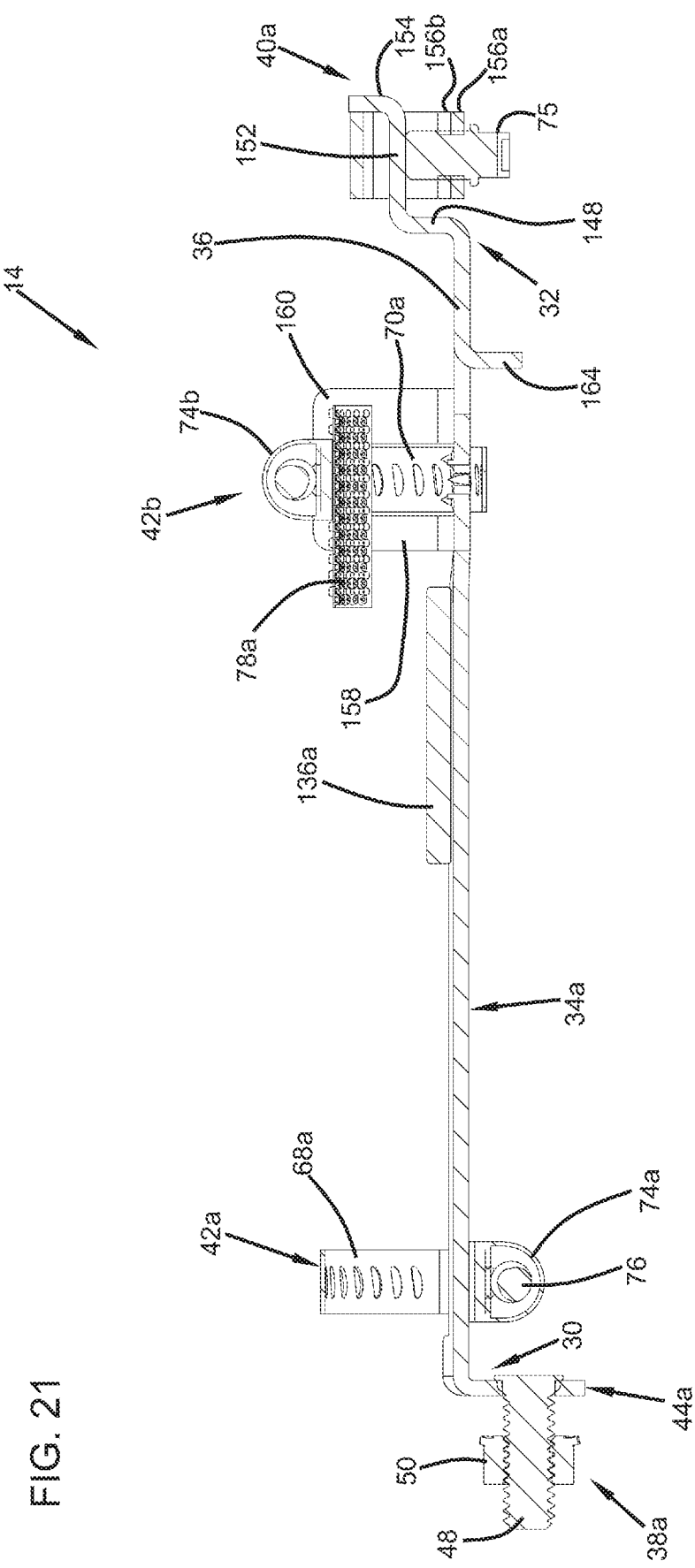
FIG. 21 is a side cross-sectional perspective view of the cable bracket assembly of FIG. 20.
Figure 22:
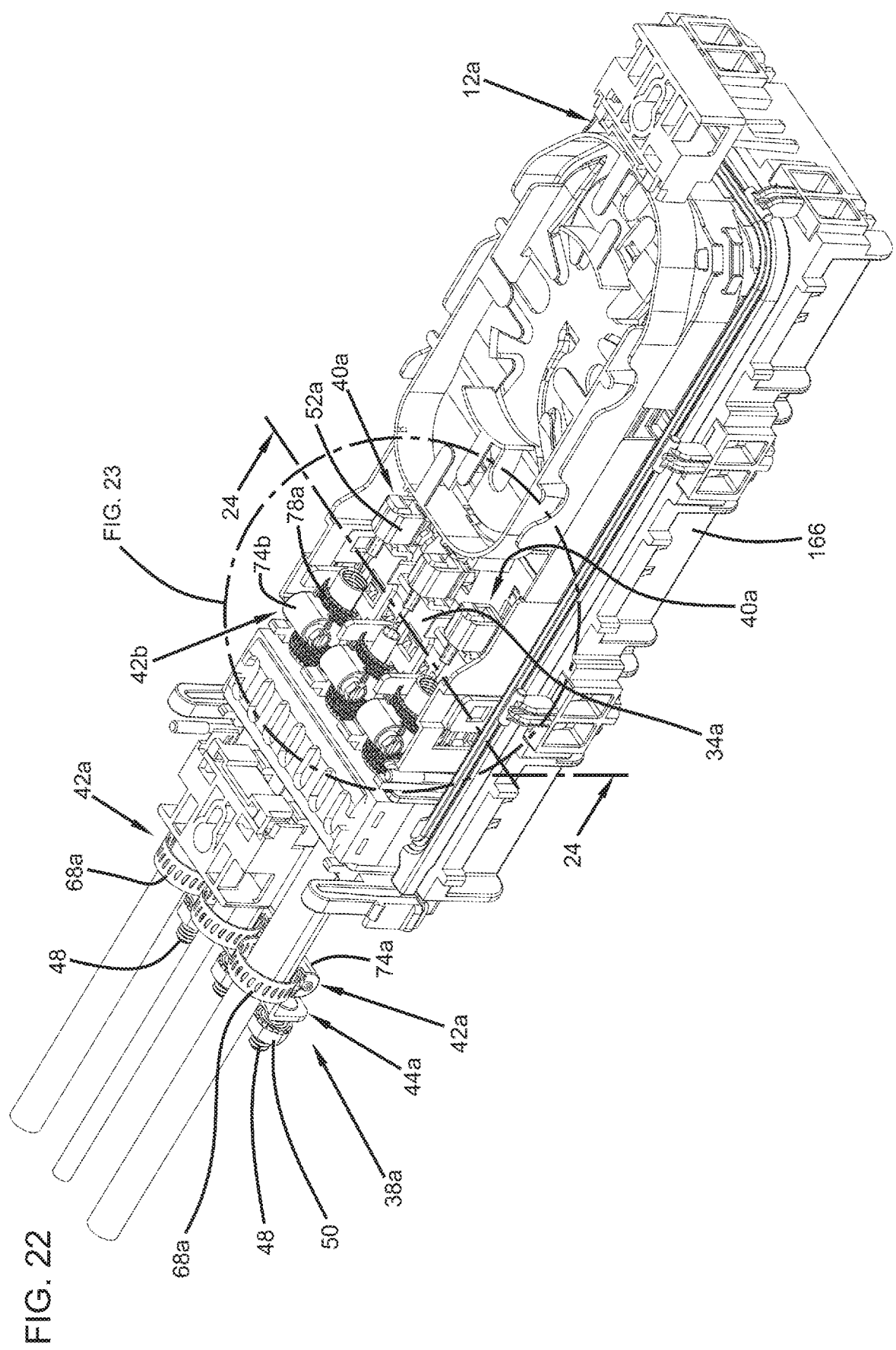
FIG. 22 is a perspective view of an alternative enclosure with the cable bracket assembly of FIG. 17 mounted therein in accordance with the present disclosure.

Turning to FIG. 13, another example intermediate seal 136a is depicted. The intermediate seal 136a has generally a flat, square configuration. That is, the intermediate seal 136a does not have an arch, bow, concave, or curved shape. FIGS. 14-16 show the intermediate seal 136a positioned on the base member 34 of the cable bracket assembly 14. In the example depicted, the intermediate seal 136a does not define a channel, although alternatives are possible.

Turning to FIGS. 17-21, another example cable bracket assembly 14a is shown in accordance with the principles of the present disclosure. It will be appreciated that to facilitate understanding of this example, like reference numbers are used to designate like elements as in the example shown in FIGS. 3-8 and described above. Accordingly, only additional elements or differences in the following example need be described below.

The cable bracket assembly 14a can include a base member 34a that has a first end 30a, and an opposite, second end 32a, a grounding attachment interface 38a, a strength member fixation mount 40a, and first and second cable fixation mounts 42a, 42b.

The base member 34a of the cable bracket assembly 14a may include an upwardly extending wall 148. The upwardly extending wall 148 may include a ramp surface 150 that leads to a base portion 152 of the strength member fixation mount 40a. The wall 148 can be a step which elevates the base member 34 with respect to the base portion 152. The strength member fixation mount 40a may include a retaining wall 154 that can extend upwardly from the base portion 152.

The strength member fixation mount 40a includes a clamping member 52a that is adapted to engage with and fix the strength member 22 when the fiber optic cable 16 is attached to the cable bracket assembly 14a. The clamping member 52a can be arranged and configured to mount over the base portion 152 of the strength member fixation mount 40a. The strength member fixation mount 40a may be made by an electrically conductive material. In other examples, the strength member fixation mount 40a need not be electrically conductive.

The strength member 22 can be in electrical contact with the strength member fixation mount 40a and, in turn, the clamping member 52a can be secured, e.g., with a fastener 75, to the base portion 152 of the strength member fixation mount 40a, such that the clamping member 52a can be mechanically connected to the strength member 22. The fastener 75, such as a bolt, may be used to move the clamping member 52a relative to the base member 34 to clamp or fix the strength member 22 within the strength member fixation mount 40a.

The fastener 75 may also be used to electrically connect the cable bracket assembly 14a to a grounding wire or a conductive plate. In certain examples, the grounding wire can be routed out of an enclosure through one of the cable ports at the cable entry. Each one of the cable bracket assemblies 14a can be grounded individually so that each cable can stand-alone or be isolated from other cables. An electrical passage is provided to the outside of the enclosure to provide outside accessibility without needing to open the enclosure or product.

In certain examples, a conductive plate or other structure can be used to electrically connect multiple cable bracket assemblies 14a together at the grounding attachment interface 38a so that one grounding wire can be used to ground all of the cable bracket assemblies 14a.

In certain examples, the clamping member 52a can be secured to the base portion 152, e.g., by a threaded bolt extending through a threaded hole 83 defined in bottom flange portions 156a, 156b of the clamping member 52a. The threaded hole 83 can be configured to receive a fastener 75, e.g., a bolt, for securing and/or adjusting the position of the clamping member 52a. The fastener 75 can be arranged and configured to move the clamping member 52a such that a strength member of a fiber optic cable can be clamped or fixed within the clamping member 52a of the strength member fixation mount 40a. In certain examples, free ends of a strength member can engage (e.g., abut against) the retaining wall 154 of the strength member fixation mount 40a. The clamping member 52a can be constructed of an electrically conductive material, although alternatives are possible.

In certain examples, the strength member fixation mount 40a can provide an electrical connection to a strength member of a fiber optic cable. The strength member fixation mount 40a can be arranged and configured to provide grounding. In certain examples, the clamping member 52a can be constructed of an electrically conductive material to provide a grounding contact. The cable bracket assembly 14a is arranged and configured to mount within the enclosure 12.

In certain examples, the base member 34a may have a longitudinal body 36a that extends between the first and second ends 30, 32. The cable bracket assembly 14a can include a grounding attachment interface 38a that is located at the first end 30 of the base member 34a. The grounding attachment interface 38a may include a 90° elbow 44a extending downwardly from the body 36a of the base member 34a. It is to be understood that varying degrees can be used for an elbow. The elbow 44a defines a hole 46a (e.g., opening, aperture) therethrough for receiving a stud 48 such that the stud 48 extends radially outwardly therefrom. A nut 50 can be secured on a threaded end of the stud 48.

The cable bracket assembly 14a includes a bracket first portion 58a having at least one feature, the first cable fixation mount 42a, for securing the fiber optic cable 16 to the cable bracket assembly 14a and a bracket second portion 60a having at least one feature, the second cable fixation mount 42b, for securing the fiber optic cable 16 to the cable bracket assembly 14a. In certain examples, the bracket first portion 58a can be positioned adjacent to the first end 30 of the base member 34a. The bracket second portion 60a can be positioned adjacent to the strength member fixation mount 40a of the cable bracket assembly 14a. The first and second cable fixation mounts 42a, 42b have similar features and advantages discussed above with reference to FIGS. 3-8.

In certain examples, the first and second cable fixation mounts 42a, 42b can be arranged and configured to align and fix the fiber optic cable 16 relative to a telecommunications enclosure 12a (see FIGS. 22-25). In one example, the first cable fixation mount 42a includes a first tunnel 64a (e.g., through hole or channel) formed in the bracket first portion 58a. Likewise, the second cable fixation mount 42b includes a second tunnel 66a (e.g., through hole or channel) formed in the bracket second portion 60a. In the example depicted, a first cable clamp 68a (e.g., first strap) is passed through the tunnel 64a of the bracket first portion 58a, and a second cable clamp 70a (e.g., second strap) is passed through the tunnel 66a of the bracket second portion 60a, although alternatives fixing structures are possible.

The first and second cable clamps 68a, 70a can be expanded and contracted through the use of actuation structures. The actuation structures can include the first and second tunnels 64a, 66a through which the first and second cable clamps 68a, 70a extend. The first and second cable clamps 68a, 70a are preferably flat straps with a rectangular cross section oriented to lie flat against a fiber optic cable during use. The first and second cable clamps 68a, 70a may be made of metal. The first and second cable clamps 68a, 70a preferably take the form of hose clamps or band clamps having a plurality of slots or shaped openings 72a.

First and second cable anchors 74a, 74b (e.g., fasteners) which comprise a screw 76 having threads can be used to shorten or lengthen the loop enclosed by the first and second cable clamps 68a, 70a and the first and second cable anchors 74a, 74b when the screw 76 is rotated. The first cable anchor 74a is provided at the first end 30 of the base member 34a for anchoring (e.g., securing, attaching, fixing, etc.) cables to the base member 34. The second cable anchor 74a is provided adjacent to the strength member fixation mount 40a of the cable bracket assembly 14a for anchoring a cable to the base member 34a.

In certain examples, the first and second cable anchors 74a, 74b feature a drive screw (e.g., a set screw) to allow the first and second cable clamps 68a, 70a to be tightened by advancing the drive screw clockwise. The threads of the screws 76 engage slots 72a in the first and second cable clamps 68a, 70a. By turning the screws 76 in a first direction, the diameters of the first and second cable clamps 68a, 70a are enlarged. By turning the screws in an opposite second direction, the diameters of the first and second cable clamps 68a, 70a are reduced. By placing cables though the first and second cable clamps 68a, 70a and then constricting the diameters of the first and second cable clamps 68a, 70a by turning the screws 76, the cables can be clamped to the fiber optic cable bracket assembly 14a. By loosening the screw 76 slightly counter-clockwise, the screw 76 may be retracted away from the first and second cable clamps 68a, 70a, which instantly releases the first and second cable clamps 68a, 70a for removal or repositioning. The first and second cable anchors 74a, 74b allow for quick and easy installation.

In certain examples, the second cable anchor 74b can be mounted between upward fingers 158 and 160 of the base member 34a on the first side 84 thereof, although alternatives are possible. The upward fingers 158, 160 can define an opening 162 (e.g., gap) for receiving the second cable clamp 70a. The upward fingers 158, 160 can be perpendicular to the base member 34a.

In certain examples, the second cable clamp 70a can make electrical contact with the shield 20 of the fiber optic cable 16 to provide a grounding contact with the fiber optic cable 16. In certain examples, a grounding conductor 78a can be placed in electrical contact with the shield 20 of the fiber optic cable 16. The second cable clamp 70a can be arranged and configured to hold the grounding conductor 78a onto the shield 20 and thereby ensures electrical contact between the fiber optic cable 16 and the grounding conductor 78a.

The grounding conductor 78a can be any flexible conductor. In the example shown, the grounding conductor 78a is a conductive mesh braid, e.g., mesh copper braid, although alternatives are possible. Conductive braids are typically flexible, allowing the braids to be folded and positioned easily. The grounding conductor 78a electrically connects the cable bracket assembly 14a to the fiber optic cable 16.

In some examples, to help establish and/or maintain an electrical contact between the shield 20 and the grounding conductor 78a, metal cable sheath fixations (e.g., metal barbs, toothed elements) 80a can be formed in the base member 34a of the cable bracket assembly 14a. The metal cable sheath fixations 80a can be made from electrically conductive material and can be configured as a plurality of teeth projecting from the base member 34a. In certain examples, the metal cable sheath fixations 80a may be made from a thin, stainless steel material, although alternatives are possible.

In the illustrated example, the metal cable sheath fixations 80a may be integrally formed with the base member 34a by a stamping operation, as would be readily understood by those skilled in the art, although alternatives are possible.

One or more teeth of the metal cable sheath fixations 80a can be arranged and configured to pierce a non-conductive protective film covering the metallic shield 20, and in that manner, bite into the metallic shield 20 to establish or enhance connection between the metallic shield 20 of the fiber optic cable 16 and the grounding conductor 78a.

The cable bracket assembly 14a can include a downward projecting tab 164 (e.g., retention member) that is arranged and configured to interface with the enclosure 12. That is, the projecting tab 164 is adapted to fit within a mounting opening defined by the enclosure 12 to limit axial movement of the cable bracket assembly 14a. The projecting tab 164 may be extend downwardly from the body 36a of the base member 34a adjacent the second cable fixation mount 42b, although alternatives are possible. In certain examples, the projecting tab 164 may be a unitary part of the base member 34a, although alternatives are possible. That is, the projecting tab 164 can be integral with, or otherwise connected to the base member 34a. In certain examples, the projecting tab 164 provides for the cable bracket assembly 14a to be in snap-fit engagement with the enclosure 12. In certain examples, the projecting tab 164 provides for the cable bracket assembly 14a to be mounted to the enclosure 12 by a friction fit. The cable bracket assembly 14a can provide an electrical passage that extends to outside of the enclosure 12 to the grounding attachment interface 38a.

Turning to FIGS. 22-25, the cable bracket assembly 14a is depicted within a first housing piece 166 of an example telecommunications enclosure 12a in accordance with the principles of the present disclosure. The enclosure 12a also includes a second housing piece (not shown) that can be adapted to mate with the first housing piece 166. The cable bracket assembly 14a can be used in a telecommunications enclosure or other product types to provide grounding paths to one or more cables entering the enclosure or product.

The cable entry location 118 enables communication between the interior of the enclosure and an outside environment. The cable entry location 118 can be selectively sized and/or closed off completely depending on how the enclosure is to be used. For example, one or more of the ports can be left open to receive fiber optic cables, or a grounding bar. The cable entry locations 118 can be configured to form a seal around the cable or grounding bar passing through the port. One or more fiber optic cable bracket assemblies 14a, corresponding to different cable entry locations 118, may be utilized. Thus, each cable bracket assembly 14a can be properly aligned with a respective cable entry location 118. Thus, each cable routed through an enclosure may be individually grounded, or isolated. In certain examples, a single ground bar may be used to connect each one of the cable bracket assemblies 14a together. It should be appreciated that the number of cable bracket assemblies 14a can be adjusted and customized according to specific requirements for a given telecommunications enclosure and, for example, the number of cables that are to pass therethrough.

Figure 23:
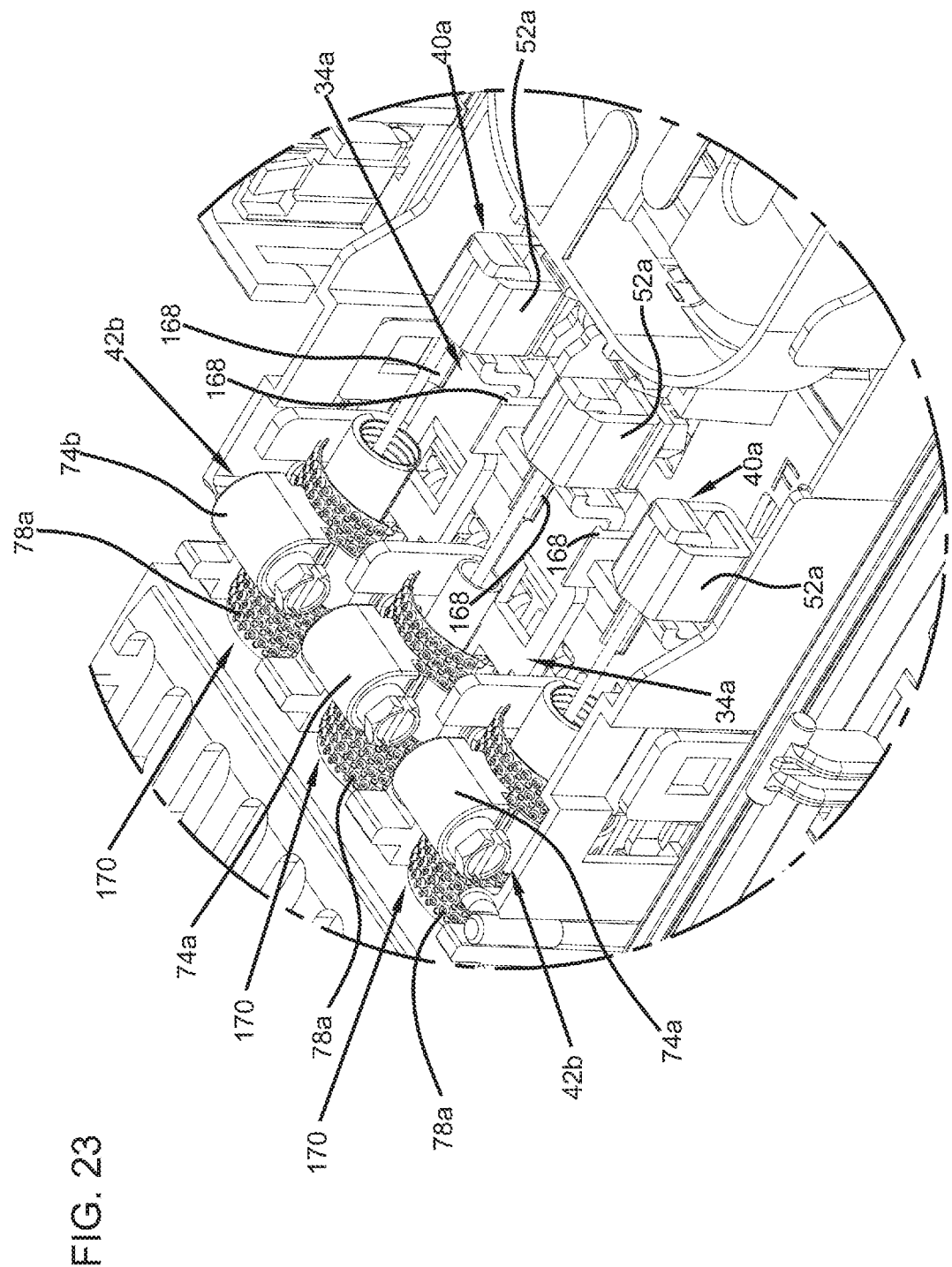
FIG. 23 is an enlarged view of a portion of the enclosure of FIG. 22 with the cable bracket assembly of FIG. 17.
Figure 24:
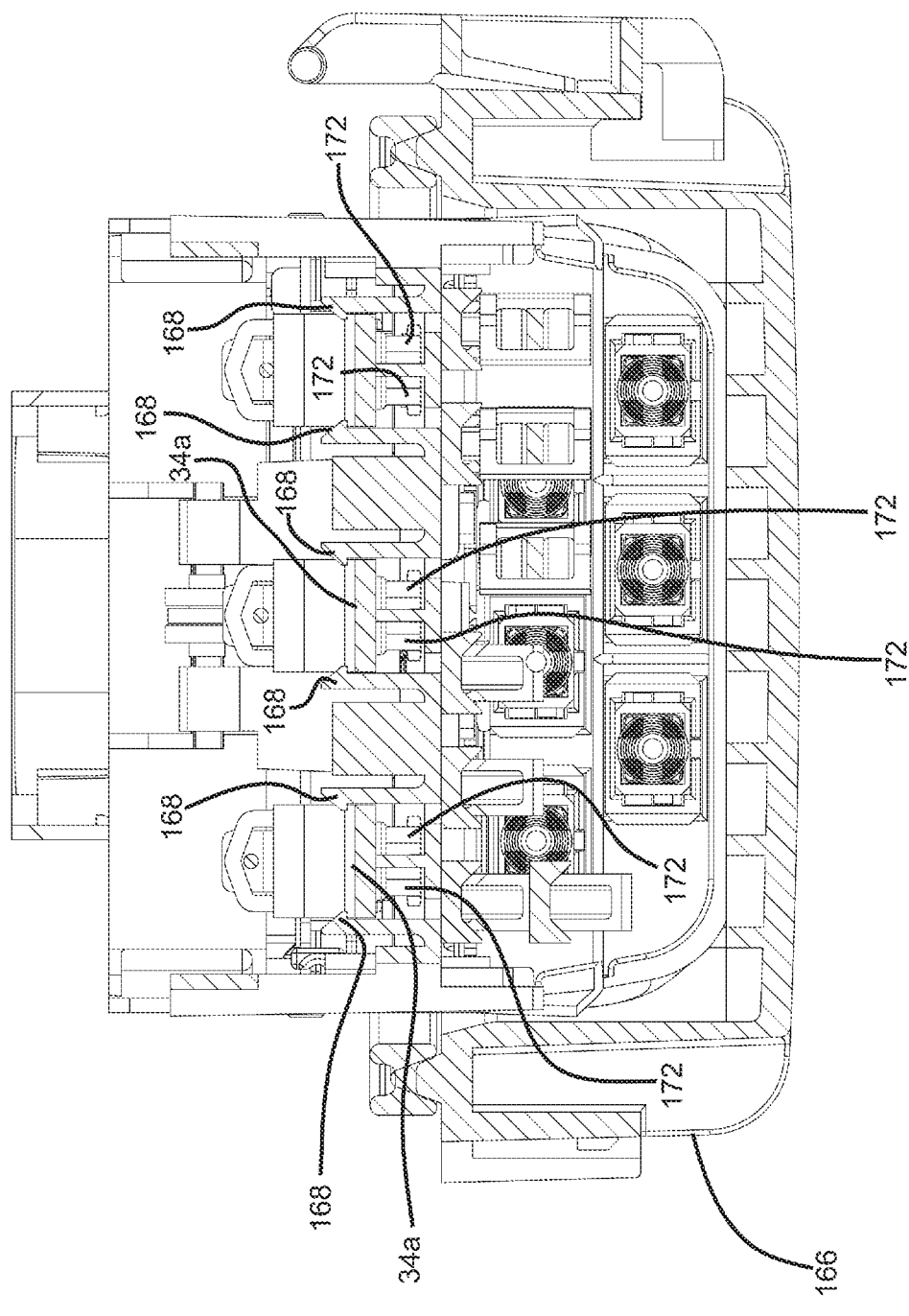
FIG. 24 is a cross-sectional view taken along section line 24-24 of FIG. 22.

Referring to FIGS. 23-24, the cable bracket assemblies 14a can be fixed (e.g., secured, mounted, attached) to the first housing piece 166 of the enclosure 12a by flexible snap-fit latches 168 formed in the enclosure 12a. The latches 168 can snap over opposing sides of the base member 34a adjacent to the step wall 148 to retain the cable bracket assemblies 14a within the enclosure 12a. In certain examples, the cable bracket assemblies 14a can be fixed to the enclosure 12a by a snap-fit configuration, although alternatives are possible. That is, the cable bracket assemblies 14a can snap down into respective channels 170 of the first housing piece 166 and be retained by latches 168. The respective cable bracket assemblies 14a are fixed such that they are not able to float within the enclosure 12a, although alternatives are possible. When the cable bracket assembly 14a is mounted in the enclosure 12a, the cable bracket assembly 14a can be supported by ribs 172 (e.g., leg members) formed in the enclosure 12a.

Figure 25:
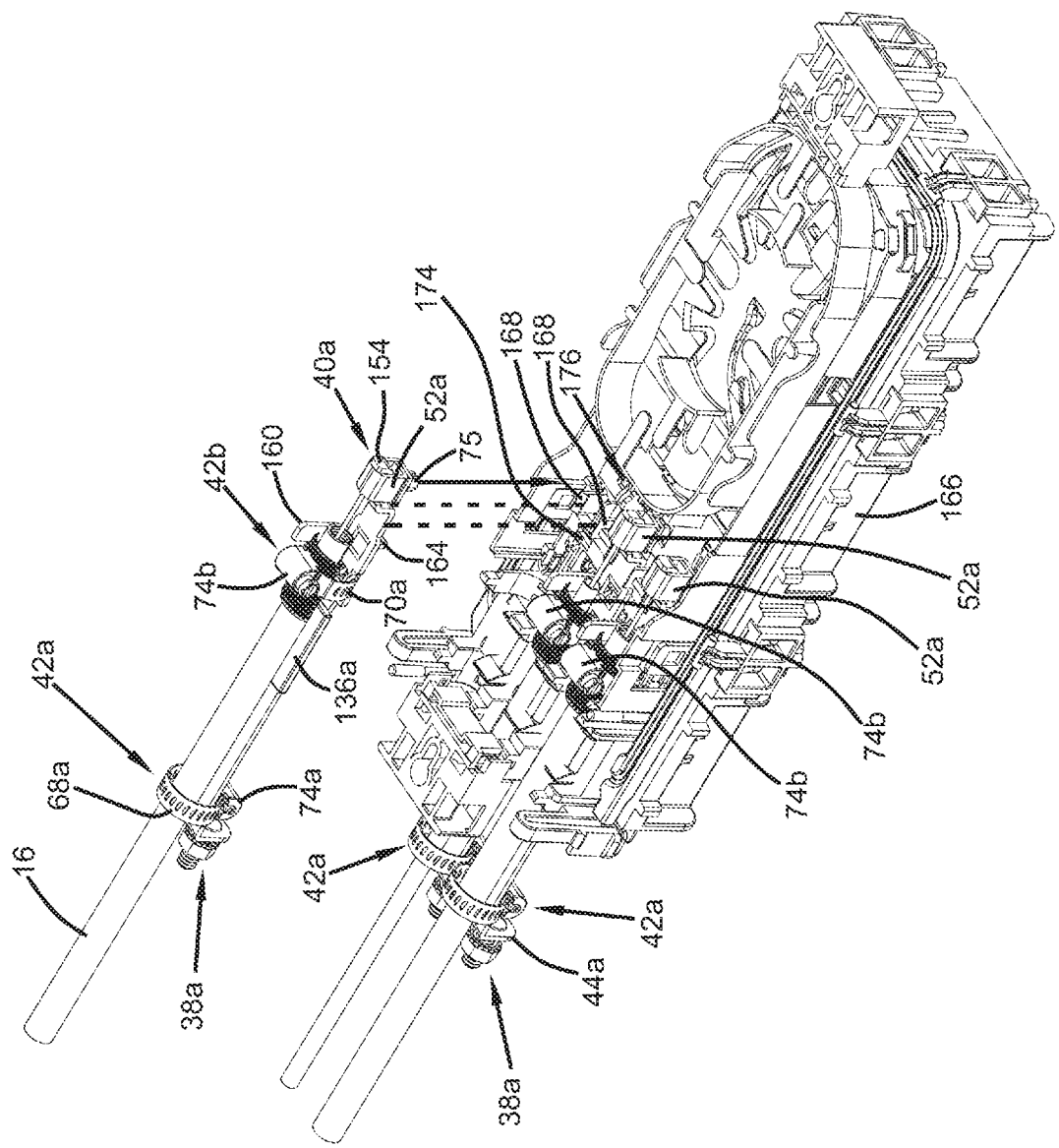
FIG. 25 is a perspective view of the enclosure of FIG. 22 showing one of the cable bracket assemblies of FIG. 17 exploded out from the enclosure of FIG. 22.

Turning to FIG. 25, the projecting tab 164 can be arranged and configured to mount within a top opening slot 174 defined in the first housing piece 166 of the enclosure 12a. When the cable bracket assembly 14a is mounted within the enclosure 12a, the projecting tab 164 can be utilized to help align the cable bracket assembly 14a and the fiber optic cable 16 thereon within the enclosure 12a. When the cable bracket assembly 14a is inserted into the enclosure 12a, the strength member fixation mount 40a can be mounted into a notched region 176 defined in the first housing piece 166 of the enclosure 12a.

From the forgoing detailed description, it will be evident that modifications and variations can be made without departing from the spirit and scope of the disclosure.

What is claimed is:

1. A cable bracket assembly for a fiber optic cable, the fiber optic cable having at least one optical fiber and at least one strength member, the cable bracket assembly comprising:
   a base member having a first end and an opposite second end, the base member having a longitudinal body that extends between the first and second ends of the base member;
   a grounding attachment interface located at the first end of the base member;
   a strength member fixation mount positioned at the second end of the base member to fix the at least one strength member, the strength member fixation mount including a clamping member, wherein the clamping member is configured to engage with the at least one strength member to provide an electrical connection therewith; and
   a cable fixation mount positioned between the first and second ends of the base member, the cable fixation mount including a cable anchor with a cable clamp for anchoring the fiber optic cable to the base member, the cable clamp making electrical contact with an electrically conductive shield of the fiber optic cable to provide a grounding contact with the fiber optic cable;
   wherein the cable bracket assembly provides an electrical passage, the cable bracket assembly being configured to make the grounding of the fiber optic cable stand-alone from other fiber optic cables.

2. The cable bracket assembly of claim 1, further comprising a grounding conductor electrically couplable to the cable anchor.

3. The cable bracket assembly of claim 2, wherein the grounding conductor is a conductive mesh braid.

4. The cable bracket assembly of claim 1, wherein the strength member fixation mount has a stepped-up configuration.

5. The cable bracket assembly of claim 1, wherein the cable clamp mounts between upward fingers of the base member.

6. The cable bracket assembly of claim 1, wherein the base member includes a downward projection tab configured to provide alignment of the fiber optic cable upon insertion.

7. The cable bracket assembly of claim 1, wherein the base member includes a pair of U-shaped arms being adapted to mount the cable bracket assembly within an enclosure to provide a floating position, and wherein, when the cable bracket assembly is mounted within the enclosure, the grounding attachment interface extends a distance such that the grounding attachment interface is accessible outside of the enclosure.

8. The cable bracket assembly of claim 1, wherein the cable bracket assembly is adapted to be secured by a snap-fit connection within an enclosure to provide a fixed position.

9. The cable bracket assembly of claim 8, wherein the cable bracket assembly is adapted to be secured via flexible snap-fit latches.

10. The cable bracket assembly of claim 1, wherein the cable clamp is a hose clamp.

11. The cable bracket assembly of claim 1, further comprising an intermediate seal wherein, when in use, the intermediate seal is positioned between the longitudinal body of the cable bracket assembly and the fiber optic cable.

12. The cable bracket assembly of claim 1, wherein the base member of the cable bracket assembly further includes metal cable sheath fixations that project from within apertures defined in the base member.

* * * * *